(12) United States Patent
Iyer et al.

(10) Patent No.: US 8,644,936 B2
(45) Date of Patent: Feb. 4, 2014

(54) FEEDTHROUGH ASSEMBLY INCLUDING ELECTRICAL GROUND THROUGH FEEDTHROUGH SUBSTRATE

(75) Inventors: Rajesh V. Iyer, Eden Prairie, MN (US); Simon E. Goldman, St. Louis Park, MN (US); Thomas P. Miltich, Otsego, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 13/346,424

(22) Filed: Jan. 9, 2012

(65) Prior Publication Data
US 2013/0176658 A1 Jul. 11, 2013

(51) Int. Cl.
*A61N 1/02* (2006.01)

(52) U.S. Cl.
USPC .............................. 607/36; 333/182; 361/302

(58) Field of Classification Search
USPC .............................. 607/36; 333/182; 361/302
See application file for complete search history.

(56) References Cited

U.S. PATENT DOCUMENTS

| | | | |
|---|---|---|---|
| 3,920,888 A | 11/1975 | Barr | |
| 4,152,540 A | 5/1979 | Duncan et al. | |
| 4,420,652 A | 12/1983 | Ikeno | |
| 4,421,947 A | 12/1983 | Kyle | |
| 4,424,551 A | 1/1984 | Stevenson et al. | |
| 4,991,582 A | 2/1991 | Byers et al. | |
| 5,287,076 A | 2/1994 | Johnescu et al. | |
| 5,333,095 A | 7/1994 | Stevenson et al. | |
| 5,434,358 A | 7/1995 | Glahn et al. | |
| 5,470,345 A | 11/1995 | Hassler et al. | |
| 5,620,476 A | 4/1997 | Truex et al. | |
| 5,650,759 A | 7/1997 | Hittman et al. | |
| 5,683,435 A | 11/1997 | Truex et al. | |
| 5,685,632 A | 11/1997 | Schaller et al. | |
| 5,735,884 A | 4/1998 | Thompson et al. | |
| 5,750,926 A | 5/1998 | Schulman et al. | |
| 5,751,539 A | 5/1998 | Stevenson et al. | |
| 5,759,197 A | 6/1998 | Sawchuk et al. | |
| 5,782,891 A | 7/1998 | Hassler et al. | |
| 5,825,608 A | 10/1998 | Duva et al. | |
| 5,836,992 A | 11/1998 | Thompson et al. | |
| 5,866,851 A | 2/1999 | Taylor et al. | |
| 5,867,361 A | 2/1999 | Wolf et al. | |

(Continued)

FOREIGN PATENT DOCUMENTS

| | | | |
|---|---|---|---|
| EP | 1977786 A3 | 10/2008 | |
| JP | 06120074 A | 4/1994 | |

(Continued)

OTHER PUBLICATIONS

U.S. Appl. No. 13/196,661, by Kengo Morioka, filed Aug. 2, 2011.

(Continued)

*Primary Examiner* — Christopher D Koharski
*Assistant Examiner* — Michael Carey

(57) ABSTRACT

A feedthrough assembly may include a ferrule defining a ferrule opening, a capacitive filter array at least partially disposed within the ferrule opening, and a feedthrough at least partially disposed within the ferrule opening. In some examples, the capacitive filter array includes a filter array ground conductive pathway. In some examples, the feedthrough includes a feedthrough ground conductive via. The feedthrough ground conductive via may be electrically coupled to the filter array ground conductive pathway, and the feedthrough ground conductive via may be electrically coupled to the ferrule.

7 Claims, 10 Drawing Sheets

(56) References Cited

U.S. PATENT DOCUMENTS

| | | |
|---|---|---|
| 5,870,272 A | 2/1999 | Seifried et al. |
| 5,896,267 A | 4/1999 | Hittman et al. |
| 5,905,627 A | 5/1999 | Brendel et al. |
| 5,959,829 A | 9/1999 | Stevenson et al. |
| 5,973,906 A | 10/1999 | Stevenson et al. |
| 5,999,398 A | 12/1999 | Makl et al. |
| 6,008,980 A | 12/1999 | Stevenson et al. |
| 6,275,369 B1 | 8/2001 | Stevenson et al. |
| 6,414,835 B1 | 7/2002 | Wolf et al. |
| 6,529,103 B1 | 3/2003 | Brendel et al. |
| 6,566,978 B2 | 5/2003 | Stevenson et al. |
| 6,660,116 B2 | 12/2003 | Wolf et al. |
| 7,068,491 B1 | 6/2006 | Burdon et al. |
| 7,196,899 B1 | 3/2007 | Feger et al. |
| 7,668,597 B2 | 2/2010 | Engmark et al. |
| 7,928,818 B2 | 4/2011 | Iyer |
| 2002/0027484 A1 | 3/2002 | Stevenson et al. |
| 2007/0060970 A1 | 3/2007 | Burdon et al. |
| 2007/0203529 A1 | 8/2007 | Iyer et al. |
| 2008/0195180 A1 | 8/2008 | Stevenson et al. |
| 2009/0079517 A1 | 3/2009 | Iyer |
| 2009/0079518 A1 | 3/2009 | Iyer |
| 2009/0281603 A1* | 11/2009 | Lim .............................. 607/72 |
| 2010/0202096 A1 | 8/2010 | Iyer |
| 2010/0284124 A1 | 11/2010 | Iyer |
| 2011/0029036 A1 | 2/2011 | Yamamoto et al. |
| 2011/0048770 A1 | 3/2011 | Reiterer et al. |
| 2011/0102967 A1 | 5/2011 | Munns et al. |

FOREIGN PATENT DOCUMENTS

| | | |
|---|---|---|
| JP | 06244057 A | 9/1994 |
| WO | 9738752 A2 | 10/1997 |
| WO | 2009117599 A2 | 9/2009 |
| WO | WO 2010129731 A2 | 11/2010 |
| WO | WO 2011014399 A1 | 2/2011 |
| WO | WO 2011025667 A1 | 3/2011 |

OTHER PUBLICATIONS

U.S. Appl. No. 13/196,683, by Kengo Morioka, filed Aug. 2, 2011.
U.S. Appl. No. 13/196,695, by Kengo Morioka, filed Aug. 2, 2011.
U.S. Appl. No. 13/149,600, by Rajesh V. Iyer, filed May 31, 2011.
U.S. Appl. No. 61/530,249, by Rajesh V. Iyer, filed Sep. 1, 2011.
U.S. Appl. No. 13/308,136, by Rajesh V. Iyer, filed Nov. 30, 2011.
U.S. Appl. No. 13/308,222, by Rajesh V. Iyer, filed Nov. 30, 2011.
U.S. Appl. No. 13/308,271, by Rajesh V. Iyer, filed Nov. 30, 2011.
U.S. Appl. No. 13/308,144, by Rajesh V. Iyer, filed Nov. 30, 2011.
U.S. Appl. No. 13/308,313, by Rajesh V. Iyer, filed Nov. 30, 2011.
Office Action from U.S. Appl. No. 13/308,313, dated Jun. 6, 2013, 8 pp.
Response to Office Action dated Jun. 6, 2013, from U.S. Appl. No. 13/308,313, filed Sep. 27, 2013, 11 pp.

* cited by examiner

FEEDTHROUGH ASSEMBLY INCLUDING ELECTRICAL GROUND THROUGH FEEDTHROUGH SUBSTRATE

TECHNICAL FIELD

The disclosure relates to electrical feedthroughs for implantable medical devices.

BACKGROUND

Electrical feedthroughs may provide an electrical pathway between an interior of a hermetically-sealed housing of an electronics device to a point outside the housing. For example, implantable medical devices (IMDs), such as implantable stimulation devices, implantable sensing devices, cardiac pacemakers, implantable cardioverter/defibrillators (ICDs) and neuromodulators, may use one or more electrical feedthroughs to make electrical connections between electrical circuitry within the implantable medical device and leads, electrodes, or sensors external to the device within a patient.

SUMMARY

In general, the disclosure is directed to feedthrough assemblies and techniques for forming feedthrough assemblies. In some examples, the feedthrough assemblies may be used to provide electrical connections between an exterior of a housing of an IMD and an interior of the housing of the IMD. The feedthrough assemblies may be filtered feedthrough assemblies, and may include at least one capacitive filter and/or a capacitive filter array.

In some examples, the disclosure describes feedthrough assemblies that include a ferrule, a feedthrough, and a capacitive filter. The feedthrough assembly may be electrically coupled to a housing of the IMD, which may function as an electrical ground. In accordance with aspects of the disclosure, the feedthrough includes a feedthrough ground conductive via. The feedthrough ground conductive via may be electrically coupled to a capacitive filter array ground conductive pathway. The feedthrough ground conductive via also may be electrically coupled to the ferrule. The ferrule may be electrically coupled to the housing of the IMD. In this way, the capacitive filter array ground conductive pathway may be electrically coupled to the housing of the IMD through the feedthrough and the ferrule.

In one aspect, the disclosure is directed to a feedthrough assembly that includes a ferrule defining a ferrule opening, a capacitive filter array at least partially disposed within the ferrule opening, and a feedthrough at least partially disposed within the ferrule opening. In some examples, the capacitive filter array includes a filter array ground conductive pathway. In some examples, the feedthrough includes a feedthrough ground conductive via. The feedthrough ground conductive via may be electrically coupled to the filter array ground conductive pathway, and the feedthrough ground conductive via may be electrically coupled to the ferrule.

In another aspect, the disclosure is directed to an IMD that includes a housing defining an opening and a feedthrough assembly disposed in the opening and attached to the housing. In accordance with this aspect of the disclosure, the feedthrough assembly may include a ferrule defining a ferrule opening, a capacitive filter array at least partially disposed within the ferrule opening, and a feedthrough at least partially disposed within the ferrule opening. In some examples, the capacitive filter array includes a filter array ground conductive pathway. In some examples, the feedthrough includes a feedthrough ground conductive via. The feedthrough ground conductive via may be electrically coupled to the filter array ground conductive pathway, and the feedthrough ground conductive via may be electrically coupled to the ferrule.

In an additional aspect, the disclosure is directed to a method that includes attaching a perimeter wall of a feedthrough to an interior wall of a ferrule to form a hermetic seal between the feedthrough and the ferrule. In some examples, the feedthrough includes a feedthrough ground conductive via. The method also may include electrically coupling the feedthrough ground conductive via to the ferrule. Further, the method may include attaching a capacitive filter array to the feedthrough. In some examples, the capacitive filter array includes a filter array ground conductive pathway and at least one ground electrode of a capacitive filter electrically connected to the filter array ground conductive pathway. The method additionally may include electrically coupling the filter array ground conductive pathway to the feedthrough ground conductive via.

The details of one or more examples are set forth in the accompanying drawings and the description below. Other features, objects, and advantages of the disclosure will be apparent from the description and drawings, and from the claims.

DETAILED DESCRIPTION

In some cases, an IMD is implanted at a different location within the patient than the target tissue that is being stimulated and/or diagnosed. The IMD may be electrically coupled to a lead that includes electrical conductors that extend from the IMD to the electrodes or sensors located at the target tissue. At the IMD, the electrical conductors may be electrically coupled to a conductive pathway through the feedthrough. In some examples, the lead conductors may act as antennae that are affected by electromagnetic signals, including electromagnetic interference (EMI). The electromagnetic signals may be transmitted along the lead conductor, through the feedthrough, and to circuitry within the IMD. In some cases, the electromagnetic signals may interfere with normal operation of circuitry within the IMD.

EMI due to stray electromagnetic signals conducted by the lead conductors may be addressed by incorporating a capacitor within the feedthrough assembly. The capacitor may act as a low-pass filter, transmitting relatively high frequency electromagnetic signals to ground (e.g., the housing of the IMD) and passing relatively low frequency signals to circuitry within the IMD. In some examples, the feedthrough assembly may include a multi-conductor feedthrough and a capacitor or capacitor array that accommodates multiple lead conductors. The capacitor or capacitor array may be attached to the multi-conductor feedthrough so that each of the conductive pathways through the multi-conductor feedthrough is electrically coupled to a corresponding conductive path in the capacitor or capacitor array while providing for a hermetic seal around each conductive pathway and between the multi-conductor feedthrough and the ferrule.

In other examples, an IMD may include one or more electrodes formed on a housing of the IMD (e.g., a leadless IMD). In some implementations, a leadless IMD may include a feedthrough assembly through which a conductor that connects the electrodes to circuitry within the leadless IMD passes. The feedthrough assemblies described herein may also be utilized in leadless IMDs.

This disclosure describes feedthrough assemblies that include a feedthrough, a capacitive filter array, and a ferrule. In some examples, the capacitive filter array includes a filter array ground conductive pathway and the feedthrough includes a feedthrough ground conductive via. The filter array ground conductive pathway may be electrically coupled to the feedthrough ground conductive pathway. The feedthrough ground conductive pathway may be electrically coupled to an electrical ground, such as a housing of an IMD. In this way, the capacitive filter array may be electrically connected to ground through the feedthrough.

Figure 1:
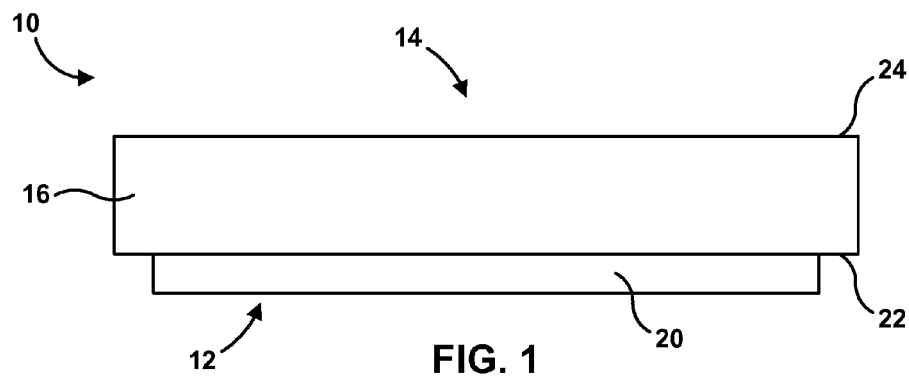
FIG. 1 is a side view that illustrates an example feedthrough assembly.
Figure 2:
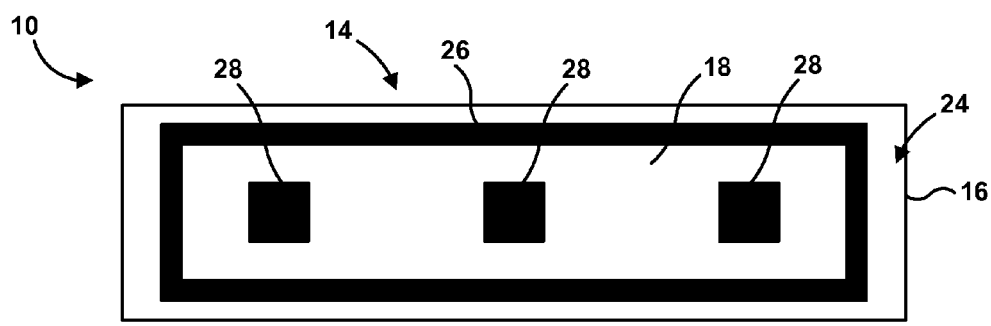
FIG. 2 is a top view that illustrates an example feedthrough assembly.
Figure 3:
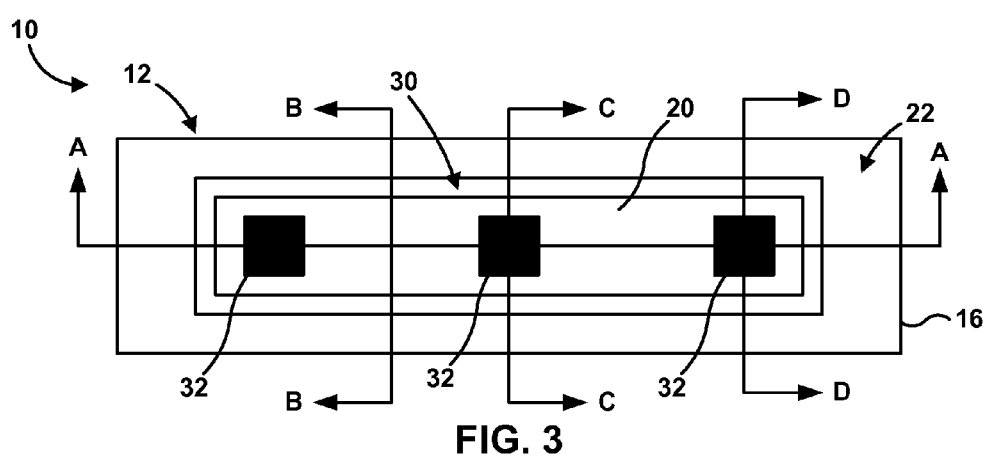
FIG. 3 is a bottom view that illustrates an example feedthrough assembly.

FIG. 1 is a side view of an example feedthrough assembly 10. Feedthrough assembly 10 includes an internally-facing side 12 and an externally-facing side 14. FIG. 2 shows a top view of feedthrough assembly 10 showing the externally-facing side 14 of feedthrough assembly 10. FIG. 3 shows a bottom view of feedthrough assembly 10 showing internally-facing side 12 of feedthrough assembly 10. The terms "internally-facing," "inwardly," and the like, when used herein in regards to feedthrough assembly 10, may generally refer to a direction toward the interior of an electronics device (e.g., an IMD) when assembly 10 is incorporated in the electronics device. Conversely, the terms "externally-facing," "outwardly," and the like, when used herein in regards to feedthrough assembly 10 generally refer to a direction toward the exterior of the electronics device when assembly 10 is incorporated in the electronics device.

As shown in FIGS. 1-3, feedthrough assembly 10 comprises a ferrule 16, a feedthrough 18, and a capacitive filter array 20. Feedthrough 12 may be coupled to capacitive filter array 20 by a plurality of electrically conductive members. The electrically conductive members will be described in further detail below.

Ferrule 16 comprises an internally-facing ferrule side 22 and an externally facing ferrule side 24. Ferrule 16 also defines a ferrule opening 30 that extends between internally-facing side 22 and externally-facing side 24. Feedthrough 12 and capacitive filter array 20 are at least partially disposed in ferrule opening 30. Ferrule 16 may be configured to be mounted to or within the housing of an electronics device, such as an IMD (see FIG. 9). In some examples, ferrule 16 may include a flange or other mechanical feature that facilitates mounting of ferrule 16 to or within the housing of the electronics device. Ferrule 16 may be mounted to the IMD housing, for example, by welding or brazing.

In one example, ferrule 16 comprises a material that facilitates mounting of ferrule 16 to the housing of an IMD. For example, the IMD housing may comprise titanium or a titanium alloy, and ferrule 16 may comprise titanium or a titanium alloy that can be welded to the IMD housing. Examples of materials from which ferrule 18 may be formed include niobium; titanium; titanium alloys such as titanium-6Al-4V or titanium-vanadium; platinum; molybdenum; zirconium; tantalum; vanadium; tungsten; iridium; rhodium; rhenium; osmium; ruthenium; palladium; silver; and alloys, mixtures, and combinations thereof. In one example, the material from which ferrule 16 is formed is selected so that ferrule 16 has a coefficient of thermal expansion (CTE) that is compatible with the CTE of feedthrough 18. In this manner, damage resulting from the heating of ferrule 16 and feedthrough 18, such as during the formation of a diffusion bonded, glassed, or brazed joint between ferrule 16 and feedthrough 18, may be reduced or substantially prevented.

Feedthrough 18 may be mounted to ferrule 16 within ferrule opening 30 using a hermetic seal 26 formed between feedthrough 18 and ferrule 16. Hermetic seal 26 may prevent bodily fluids of the patient from passing into the interior of IMD housing between ferrule 16 and feedthrough 18, which could lead to damage to the internal electronics of the IMD. In one example, hermetic seal 26 comprises a braze joint between feedthrough 18 and ferrule 16 (e.g., formed using laser brazing). In other examples, hermetic seal 26 may be formed using diffusion bonding. Examples of materials that may be used to form a hermetic seal 26 include any biocompatible, biostable material capable for forming a hermetic seal 26, such as, gold, a nickel-gold alloy, platinum, and platinum-iridium. Laser sintering of glass may also be used to bond feedthrough 18 to ferrule 16.

Figure 4A:
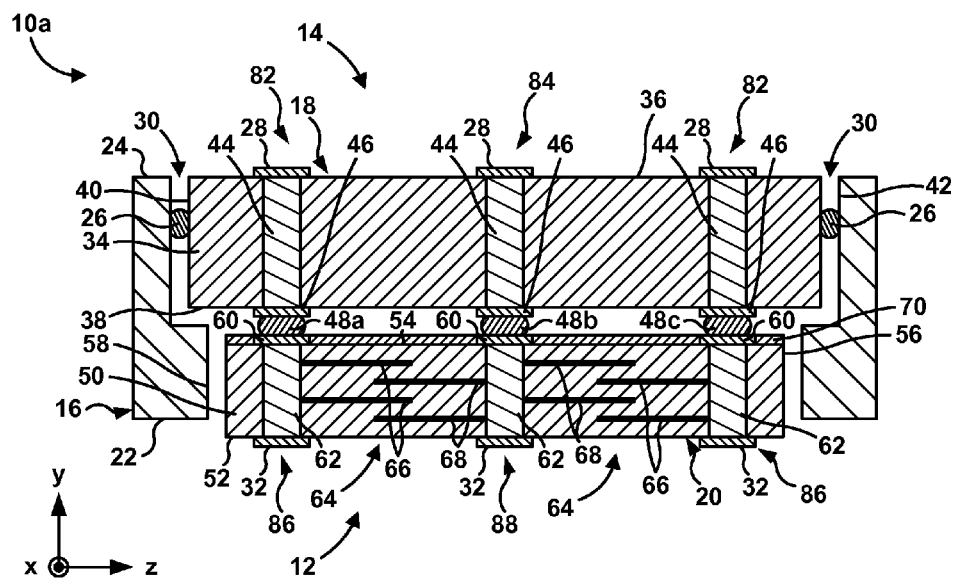
FIGS. 4A-4C are cross-sectional views taken along section lines A-A, B-B, and C-C of FIG. 3 that illustrate an example configuration of a feedthrough assembly.
Figure 4B:
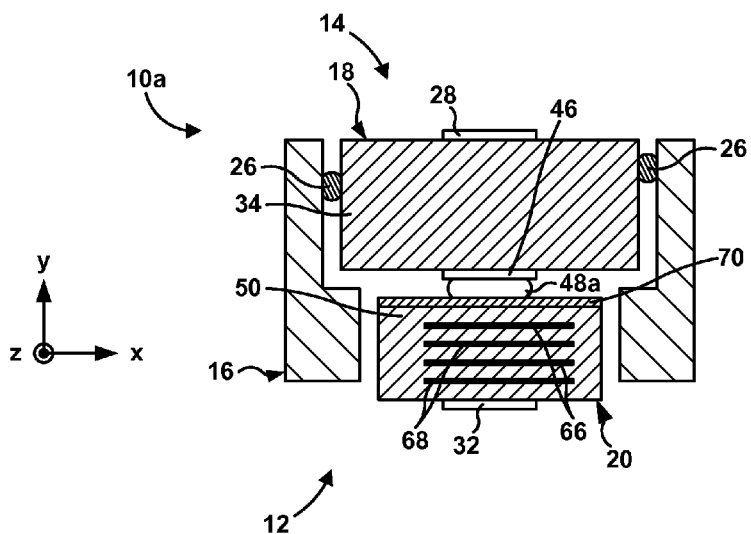
Figure 4C:
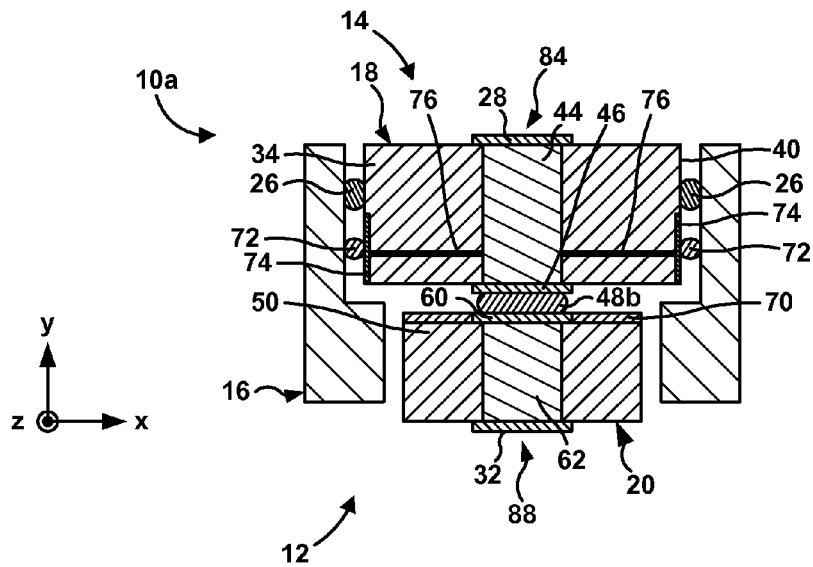

FIGS. 4A-4C are cross-sectional views of an example feedthrough assembly 10a taken along section lines A-A, B-B, and C-C shown in FIG. 3, respectively. As shown in FIGS. 4A-4C, feedthrough 18 includes a feedthrough substrate 34. Feedthrough substrate 34 defines an externally-facing feedthrough side 36 and an internally-facing feedthrough side 38. Externally-facing feedthrough side 36 is oriented generally opposite to internally-facing feedthrough side 38. Feedthtrough substrate 34 also defines a feedthrough substrate perimeter wall 40, which is oriented facing a first interior wall 42 of ferrule 16. Feedthrough 18 also includes a plurality of feedthrough conductors 44, which each extend between externally-facing feedthrough side 36 and internally-facing feedthrough side 38. Each of feedthrough conductors 44 is electrically and physically coupled to a respective one of externally-facing feedthrough conductive pads 28 and a respective one of internally-facing feedthrough conductive pads 46. Externally-facing feedthrough conductive pads 28 may be disposed on or near externally-facing feedthrough side 36. Internally-facing feedthrough conductive pads 46 may be disposed on or near internally-facing feedthrough side 38. Each of feedthrough conductors 44 may be substantially electrically isolated from the other feedthrough conductors 44. Although FIG. 4A shows an example in which feedthrough 18 includes three externally-facing feedthrough conductive pads 28, three feedthrough conductors 44, and three internally-facing feedthrough conductive pads 46, in other examples, feedthrough 18 may include fewer or more externally-facing feedthrough conductive pads 28, feedthrough conductors 44, and internally-facing feedthrough conductive pads 46 (e.g., one, two, or at least four).

In some examples, feedthrough substrate 34 comprises a ceramic material formed from a single layer. In other examples, feedthrough substrate 34 includes multi-layer ceramic formed from a plurality of generally planar ceramic layers (not shown in FIGS. 4A and 4B). In examples in which feedthrough substrate 34 is formed from multiple ceramic layers, each ceramic layer may be shaped in a green state to have a layer thickness and a plurality of via holes extending there through between an internally facing layer surface and an externally facing layer surface. The ceramic layers then may be coupled together, such as by laminating the layers together, and may be cofired together so that the layers form a substantially monolithic feedthrough substrate 34. In some examples, the via holes of each ceramic layer may be substantially aligned to form generally cylindrical passages that are filled with an electrically conductive material to form feedthrough conductors 44.

In some examples, feedthrough substrate 34 may comprise a high-temperature cofired ceramic (HTCC) material, e.g., a ceramic that is sintered at a temperature of at least about 1300° C., for example a material that is sintered at a temperature of at least about 1600° C. In some embodiments, HTCC uses 1) an electrical insulator that includes alumina and may include oxides of Si (silica), Ca (calcia), Mg (magnesia), Zr (zirconia), and the like and 2) an electrical conductor, such as platinum or Pt—Ir. The assembly of the electrical insulator and electrical conductor can be fired (sintered) above 1000° C., such as about 1600° C. In this sintering process, polymeric binders may be driven off and the particles forming the ceramic and metal coalesce and fuse. Grains may diffuse together forming larger grains at the expense of smaller grains.

In one example, feedthrough substrate 34 comprises an HTCC liquid-phase, sintered alumina with platinum metallization. In one example, feedthrough substrate 34 may comprise at least about 70% alumina, for example at least about 90% alumina having a sintering temperature of between about 1550° C. and about 1600° C. In some examples, feedthrough substrate 34 consists essentially of a HTCC, and in some examples, feedthrough substrate 34 consists of a HTCC.

Examples of materials and methods for making a cofired ceramic substrate are described in the commonly assigned U.S. Provisional Patent Application Ser. No. 61/530,249, filed on Sep. 1, 2011; the commonly assigned U.S. Provisional Patent Application Ser. No. 61/238,515, filed on Aug. 31, 2009; the commonly assigned United States Patent Application Publication No. 2011/0048770, filed on Jan. 26, 2010, the commonly assigned U.S. Pat. No. 6,414,835, issued on Jul. 2, 2002, the commonly-assigned U.S. Pat. No. 6,660,116, issued on Dec. 9, 2003, U.S. patent application Ser. No. 13/196,661, filed on Aug. 2, 2011, U.S. patent application Ser. No. 13/196,683, filed on Aug. 2, 2011, and U.S. patent application Ser. No. 13/196,695, filed on Aug. 2, 2011, the entire disclosures of which are incorporated herein by reference.

Conduction of electrical signals between externally-facing feedthrough side 36 and internally-facing feedthrough side 38 may be accomplished using externally-facing feedthrough conductive pads 28, feedthrough conductors 44 and internally-facing feedthrough conductive pads 46. Together, a respective one of externally-facing feedthrough conductive pads 28, a respective one of feedthrough conductors 44, and a respective one of internally-facing feedthrough conductive pads 46 form a feedthrough conductive pathway between externally-facing feedthrough side 36 and internally-facing feedthrough side 38. As described below, in the example shown in FIGS. 4A-4C, two of the feedthrough conductive pathways may include feedthrough active conductive pathways 82 and one of the feedthrough conductive pathways may include a feedthrough ground conductive pathway 84. The feedthrough active conductive pathways 82 provide for an electrical pathway for electrical signals to be transmitted across feedthrough substrate 34, such as stimulation signals transmitted from electronics within an IMD housing for stimulation of a target tissue, or bioelectric signals sensed proximate a target tissue that are transmitted into the IMD housing for analysis by IMD electronics. The feedthrough ground conductive pathway 84 may provide an electrical pathway for electrical signals to be transmitted from filter array ground conductive pathway 88 to an electrical ground, such as the IMD housing.

Feedthrough conductors 44 may comprise a conductive material, such as a metal or alloy, that substantially fills a passageway that extends within and/or through feedthrough substrate 34. In one example, a hermetic seal is formed at the interface between each of feedthrough conductors 44 and feedthrough substrate 34. The hermetic seal may be formed by many methods, such as by forming a braze joint between the material that forms feedthrough conductors 44 and the material that forms feedthrough substrate 34. In one example, described in more detail below, the hermetic seal is formed by cofiring the materials that form feedthrough substrate 34 and feedthrough conductors 44 so that the material that forms conductors 44 bonds with the material that forms feedthrough substrate 34.

Each feedthrough conductive pathway 82, 84 also may include an internally-facing feedthrough conductive pad 46 at internally-facing feedthrough side 38. Each conductive pad 46 may provide a contact area to provide for electrical and/or mechanical coupling between the respective feedthrough conductive pathway 82, 84 and a respective one of the filter array conductive pathways 86, 88 in capacitive filter array 20. In some examples, each internally-facing feedthrough conductive pad 46 is electrically and mechanically coupled to a corresponding one of feedthrough conductors 44.

Each feedthrough conductive pathway 82, 84 may also include an externally-facing feedthrough conductive pad 28 at externally-facing side 36. Each conductive pad 28 may provide contact area to provide for electrical and/or mechanical coupling of a conductor, such as a lead conductor for an IMD, to the respective feedthrough active conductive pathway 82. In some examples, each externally-facing feedthrough conductive pad 28 is electrically and mechanically coupled to a corresponding one of feedthrough conductors 44.

In some examples, feedthrough conductors 44 and conductive pads 28, 46 each include an electrically conductive material, such as an electrically conductive metal or alloy. Examples of electrically conductive materials that may be used for feedthrough conductors 44 and/or conductive pads 28, 46 include, but are not limited to, transition metals (e.g., noble metals), rare earth metals (e.g., actinide metals and lanthanide metals), alkali metals, alkaline-earth metals, and rare metals. Examples of materials that may be used to form conductors 44 and/or conductive pads 28, 46 include, but are not limited to, copper (Cu), silver (Ag), gold (Au), platinum (Pt), palladium (Pd), niobium (Nb), iridium (Ir), titanium (Ti), tungsten (W), molybdenum (Mb), zirconium (Zr), osmium (Os), tantalum (Ta), vanadium (V), rhodium (Rh), rhenium (Re), and ruthenium (Ru), platinum-gold alloys, platinum-iridium alloys, platinum-palladium alloys, gold-palladium alloys, titanium alloys, such as Ti-6Al-4V, Ti-45Nb, Ti-15Mo or titanium-vanadium, tungsten-molybdenum alloys, and alloys, mixtures, and combinations thereof.

With respect to internally-facing feedthrough conductive pads 46, in some examples, the material and structure of conductive pads 46 may be selected to support bonding of a corresponding electrical connection (such as one of thick film conductive paste 48) to provide electrical and mechanical coupling between respective ones of internally-facing feedthrough conductive pad 46 and respective ones of externally-facing filter conductive pads 60.

With respect to externally-facing feedthrough conductive pads 28, the material and structure of conductive pads 28 may be selected to support welding of a conductor, such as a wire or conductor used in a lead for an IMD, to external surfaces of respective ones of conductive pads 28. Examples of materials that may be used in an IMD lead conductor that may be welded to conductive pads 28 include, but are not limited to, niobium (Nb), a MP35N or MP35NLT nickel-based alloy, silver core Co—Cr—Ni alloy, tantalum, silver core Ta, Ti, Ti-45Nb, Ti—Mo alloys, and alloys meeting ASTM standard F562. Examples of processes that may be used to attach the lead conductor to conductive pads 28 include, but are not limited to, laser welding, parallel gap welding, thermosonic bonding, diffusion bonding, ultrasonic welding, opposed gap welding, laser brazing, step gap resistance welding, brazed interposer, percussion arc welding, or soldering (conventional or laser).

In some examples in which feedthrough substrate 34 comprises a HTCC material, feedthrough conductors 44 and/or externally-facing feedthrough conductive pads 28 and/or internally-facing feedthrough conductive pads 46 may include a conductive paste that is used to fill passageways extending from externally-facing feedthrough side 36 and internally-facing feedthrough side 38 to form feedthrough conductors 44. The conductive paste may comprise, for example, a metallic paste that is applied to the passageways, for example a platinum-containing paste, a tungsten-containing paste, Nb-containing paste, Ta-containing paste, Au-containing paste, or a molymanganese-containing paste. Such materials may be biocompatible and biostable materials. In one example, the metallic paste primarily comprises a metallic powder, such as platinum powder, and an additive to promote bonding with the material of feedthrough substrate 34. The additive may additionally or alternatively provide for thermal expansion compatibility between the conductive paste used to form feedthrough conductors 44 (and/or pads 28, 46) and the HTCC material of feedthrough substrate 34. In one example, the additive comprises alumina, so that the metallic paste may comprise, for example, a majority of metallic powder, such as platinum powder, and a minority of alumina powder or particles mixed therein.

In some examples, feedthrough conductors 44 and/or pads 28, 46 formed from a conductive paste, such as a platinum and alumina containing paste, and a feedthrough substrate 34 comprising an HTCC material, such as a sintered alumina, are cofired together, e.g., at a temperature of around 1600° C., so that the conductive paste and HTCC material bond together and form hermetic seal.

Capacitive filter array 20 may include a capacitive filter substrate 50 that defines an internally-facing filter array side 52 and an externally-facing filter array side 54. Capacitive filter substrate 50 also defines a filter array perimeter 56, which generally faces a second interior wall 58 of ferrule 16. Capacitive filter array 20 further includes a plurality of filter array conductive pathways. In the example illustrated in FIGS. 4A-4C, two of the filter array conductive pathways are filter array active conductive pathways 86 and one of the filter array conductive pathways is a filter array ground conductive pathway 88. As shown in FIG. 4A, each of the filter array conductive pathways 86, 88 includes a respective one of externally-facing filter conductive pads 60, a respective one of filter array conductors 62, and a respective one of internally-facing filter conductive pads 32.

Although FIG. 4A illustrates an example capacitive filter array 20 that includes three filter array conductive pathways, in other examples, capacitive filter array 20 may include fewer or more than three filter array conductive pathways (e.g., one, two, or at least four). Similarly, capacitive filter array 20 may include fewer or more than two filter array active conductive pathways 86 (e.g., one or at least three), and more than one filter array ground conductive pathway 88 (e.g., at least two).

Capacitive filter array 20 further includes at least one capacitive filter 64 defined within capacitive filter substrate 50, respective ones of which are electrically coupled to respective ones of the filter array active conductive pathways 86. Each of the filter array active conductive pathways 86 provides an electrical pathway for electrical signals to be transmitted through capacitive filter array 20, such as stimulation signals transmitted from electronics within an IMD housing for stimulation of a target tissue or bioelectric signals sensed proximate a target tissue that are transmitted into the IMD housing for analysis by IMD electronics. Capacitive filter array 20 filters the electrical signals transmitted through filter array active conductive pathways 86 using capacitive filters 64.

Capacitive filter substrate 50 may be formed of a ceramic material. In some examples, capacitive filter substrate 50 may be formed from a single layer. In other examples, capacitive filter substrate 50 includes a multi-layer ceramic formed from a plurality of generally planar ceramic layers (not shown in FIGS. 4A-4C). In examples in which capacitive filter substrate 50 is formed from multiple ceramic layers, each ceramic layer may be shaped in a green state to have a layer thickness and a plurality of via holes extending therethrough between an internally facing layer surface and an externally facing layer surface. The ceramic layers then may be coupled together, such as by laminating the layers together, and may be cofired together so that the layers form a substantially monolithic capacitive filter substrate 50. In some examples, the passageways of each ceramic layer may be substantially aligned to form generally cylindrical passages that are filled with an electrically conductive material to form filter array conductors 62.

In some examples, capacitive filter substrate 50 may comprise a high-temperature cofired ceramic (HTCC) material, e.g., a ceramic that is sintered at a temperature of at least about 1300° C., for example a material that is sintered at a temperature of at least about 1600° C. In some embodiments, HTCC uses 1) an electrical insulator that includes alumina and may include oxides of Si (silica), Ca (calcia), Mg (magnesia), Zr (zirconia), and the like and 2) an electrical conductor, such as platinum or Pt—Ir. The assembly of the electrical insulator and electrical conductor can be fired (sintered) above 1000° C., such as about 1600 C. In this sintering process, polymeric binders may be driven off and the particles forming the ceramic and metal coalesce and fuse. Grains may diffuse together forming larger grains at the expense of smaller grains.

Capacitive filter array 20 also includes a plurality of filter array conductive pathways 86, 88. As described above, each filter array conductive pathway includes a respective one of externally-facing filter conductive pads 60, a respective one of filter array conductors 62, and a respective one of internally-facing filter conductive pads 32. Filter array conductors 62 and conductive pads 32, 60 each may include an electrically conductive material, such as an electrically conductive metal or alloy. Examples of electrically conductive materials that may be used for filter array conductors 62 and/or conductive pads 32, 60 include, but are not limited to, transition metals (e.g., noble metals), rare earth metals (e.g., actinide metals and lanthanide metals), alkali metals, alkaline-earth metals, and rare metals. Examples of materials that may be used to form filter array conductors 62 and/or conductive pads 32, 60 include, but are not limited to, copper (Cu), silver (Ag), gold (Au), platinum (Pt), palladium (Pd), niobium (Nb), iridium (Ir), titanium (Ti), tungsten (W), molybdenum (Mb), zirconium (Zr), osmium (Os), tantalum (Ta), vanadium (V), rhodium (Rh), rhenium (Re), and ruthenium (Ru), platinum-gold alloys, platinum-iridium alloys, platinum-palladium alloys, gold-palladium alloys, titanium alloys, such as Ti-6Al-4V, Ti-45Nb, Ti-15Mo or titanium-vanadium, tungsten-molybdenum alloys, and alloys, mixtures, and combinations thereof.

With respect to externally-facing filter conductive pads 60, in some examples, the material and structure of conductive pads 60 may be selected to support bonding of a corresponding electrical connection (such as one of thick film conductive paste 48) to provide electrical and mechanical coupling between respective ones of internally-facing feedthrough conductive pads 46 and respective ones of externally-facing filter conductive pads 60.

With respect to internally-facing filter conductive pads 32, in some examples, the material and structure of conductive pads 32 may be selected to support an electrical connection to a corresponding electrical conductor that extends between internally-facing filter conductive pads 32 and circuitry of the IMD (e.g., sensing circuitry, therapy delivery circuitry, or the like). In some examples, interior-facing feedthrough conductive pads 46 maybe electrically and mechanically connected to exterior-facing filter conductive pads 60 using thick film conductive paste 48a, 48b, 48c (collectively, "thick film conductive paste 48"). In other examples, interior-facing feedthrough conductive pads 46 maybe electrically and mechanically connected to exterior-facing filter conductive pads 60 using another electrically conductive connection, such as a solder connection, a lead frame assembly, or the like.

In some examples, thick film conductive paste 48 may include a silver-palladium (Ag—Pd) mixture or alloy. In some implementations, the Ag—Pd mixture or alloy may include about 70 weight percent (wt. %) Ag and about 30 wt. % Pd. In some examples, the Ag—Pd mixture or alloy may also include glass frit (e.g., glass particles mixed in the Ag—Pd mixture or alloy). In some examples, the glass frit includes a zinc borosilicate glass particles, and may be dispersed in an organic binder.

In some examples, an electrically insulating layer 70 may be placed between feedthrough 18 and filter array 20 in order to reduce or prevent high-voltage arcing between feedthrough 18 and filter array 20. Electrically insulating layer 70 may also be provided to prevent arcing between the conductive path (which may be continuous between the externally-facing feedthrough conductive pads 28 and filter array 20) and ferrule 16, between the conductive path and perimeter conductive contact 72, or between adjacent conductive paths, as any direct line of sight between the conductive two electrically conductive materials may cause surface arcing. In this sense, electrically insulating layer 70 may reduce or substantially prevent surface arcing.

Electrically insulating layer 70 may include an electrically insulating material, such as an electrically insulating polymer formed on externally-facing filter array side 54. In one example, electrically insulating layer 70 comprises a polyimide polymer with a glass transition temperature of greater than about 400° C. In some examples, electrically insulating layer 70 may comprise a low temperature cofired ceramic material or a HTCC material.

Figure 7A:
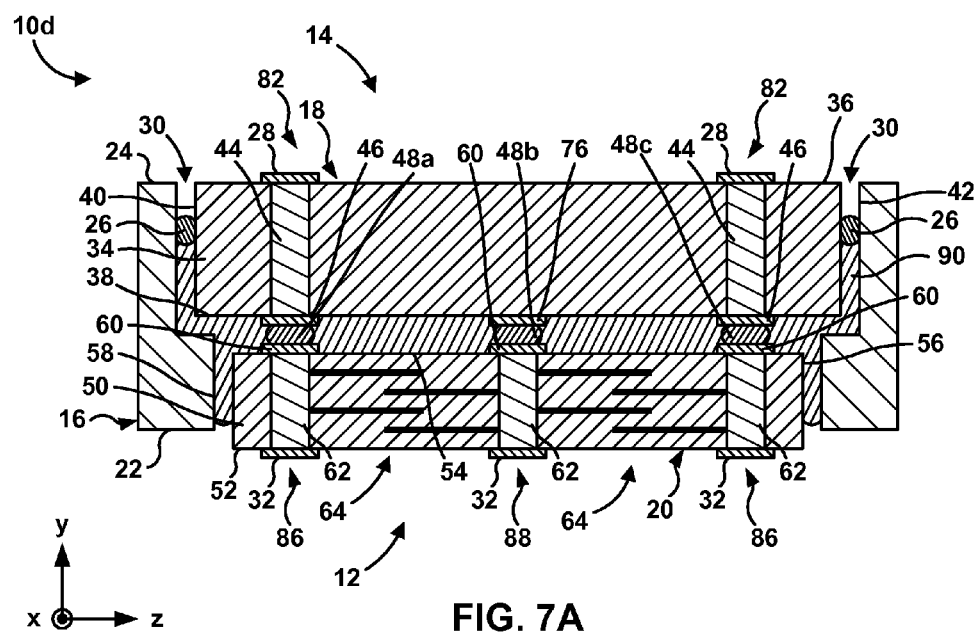
FIGS. 7A and 7B are cross-sectional views taken along section lines A-A and C-C of FIG. 3 that illustrate another example configuration of a feedthrough assembly.
Figure 7B:
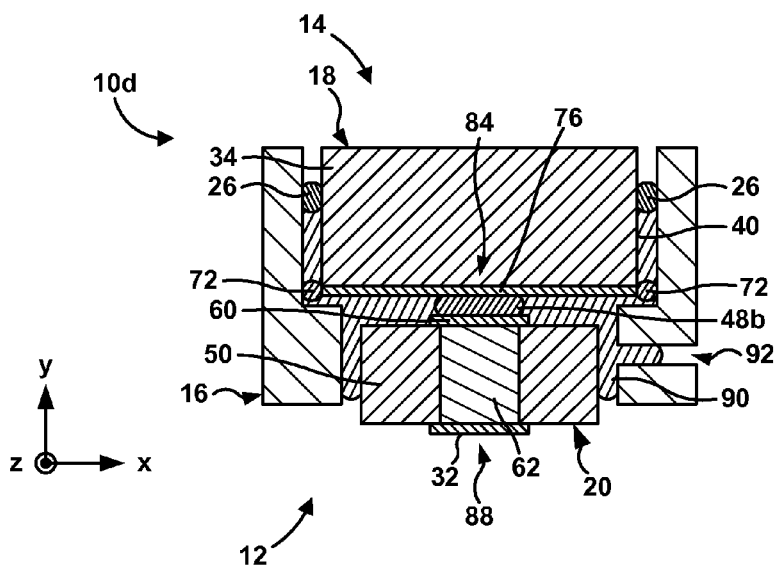
Figure 8A:
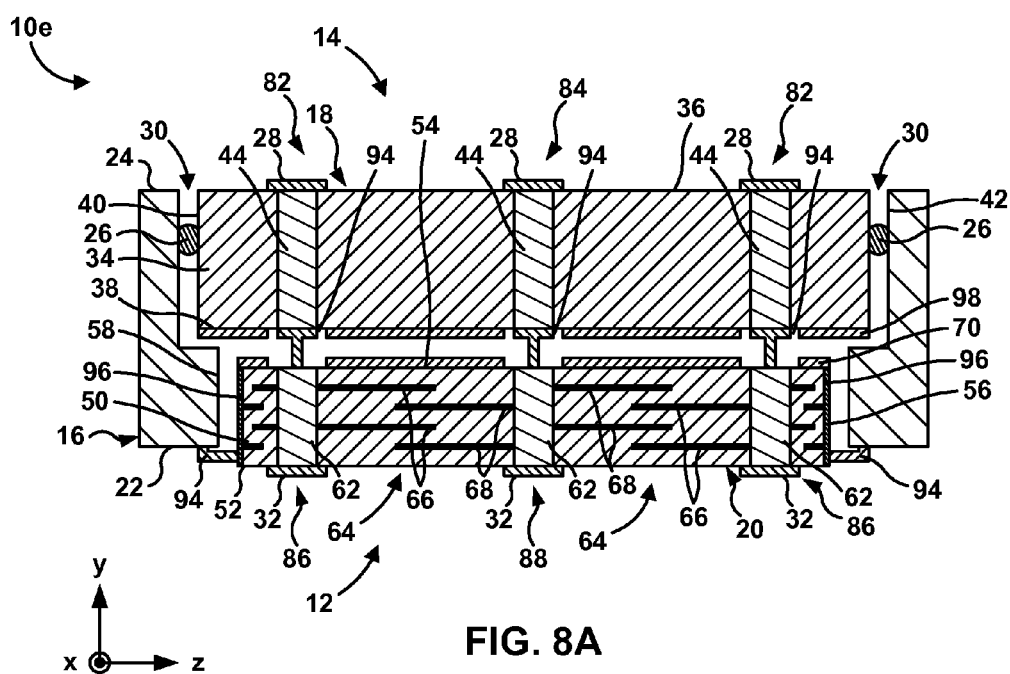
FIGS. 8A-8C are cross-sectional views taken along section lines A-A, D-D, and C-C of FIG. 3 that illustrate another example configuration of a feedthrough assembly.
Figure 8B:
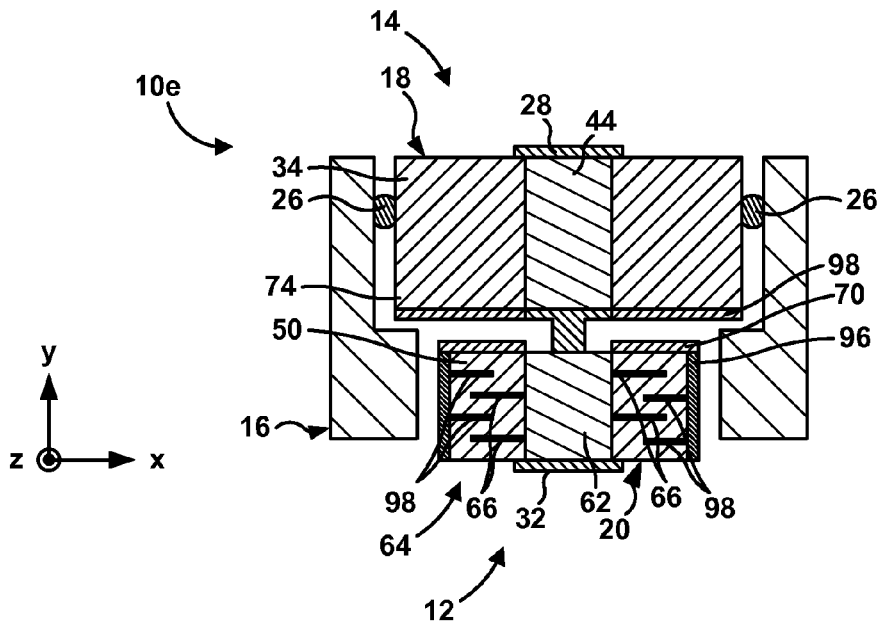
Figure 8C:
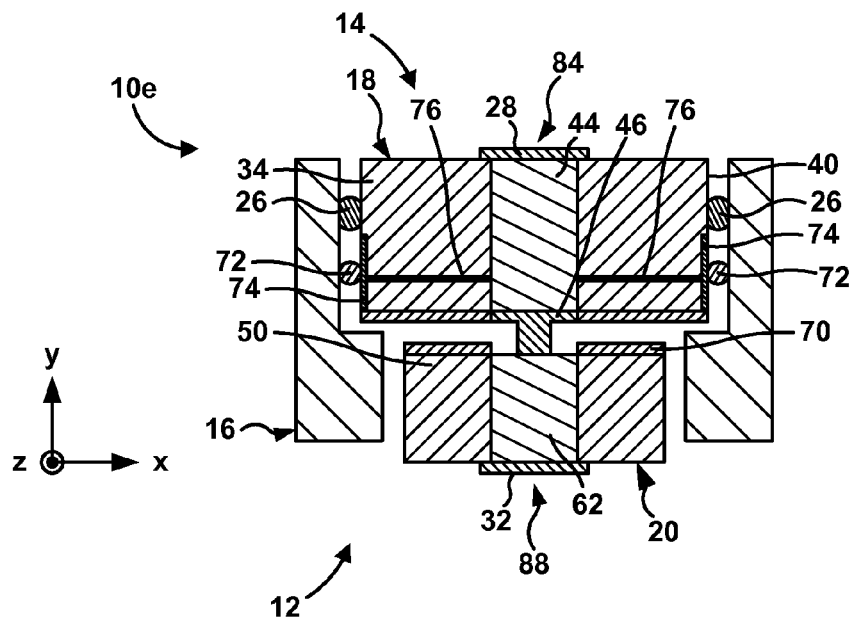

Although not shown in FIGS. 4A-4C, in some examples, electrically insulating layer 70 may additionally or alternatively be formed on internally-facing feedthrough side 38, internally-facing filter array side 52, and/or externally-facing feedthrough side 36 (as shown in FIGS. 8A-8C). In some examples, as described below with respect to FIGS. 7A and 7B, an electrically insulating layer may extend substantially continuously in the space between externally-facing filter array side 54 and internally-facing feedthrough side 38.

Filter array conductors 62 in each of filter array active conductive pathways 86 are electrically coupled to a corresponding capacitive filter 64 that provides for filtering of electrical signals that are conducted through the corresponding one of filter array active conductive pathways 86. For example, each capacitive filter 64 may provide for filtering of current induced in an IMD lead by external electromagnetic fields so that the induced current is not inadvertently interpreted by the IMD circuitry as a signal, such as a telemetry signal.

In some examples, each capacitive filter 64 comprises a plurality of layers (not shown) of ceramic, such as barium titanate, with conductive active electrodes 66 and ground electrodes 68 formed on the layers, such as by printing the material of electrodes 66, 68, for example silver, silver-palladium, or silver-platinum, onto the layers before stacking and laminating the layers. Active electrodes 66 may be electrically connected to filter array conductors 62 in each of filter array active conductive pathways 86. Ground electrodes 68 are electrically connected to filter array ground conductive pathway 88, such as filter array conductor 62 filter array ground conductive pathway 88. Ground electrodes 68 may be electrically coupled to an electrical ground (such as a housing of the IMD in which feedthrough assembly 10a is used) via feedthrough ground conductive pathway 84.

In accordance with some aspects of the disclosure, capacitive filters 64 may be electrically coupled to an electrical ground through feedthrough ground conductive pathway 84. As shown in FIG. 4C, feedthrough ground conductive pathway 84 may include internally-facing feedthrough conductive pad 46, feedthrough conductor 44, externally-facing feedthrough conductive pad 28, and feedthrough ground conductive via 76. However, in some examples, feedthrough ground conductive pathway 84 may not include an externally-facing feedthrough conductive pad 28 (e.g., because in some examples, feedthrough ground conductive pathway 84 may not be connected to a lead conductor).

Figure 6A:
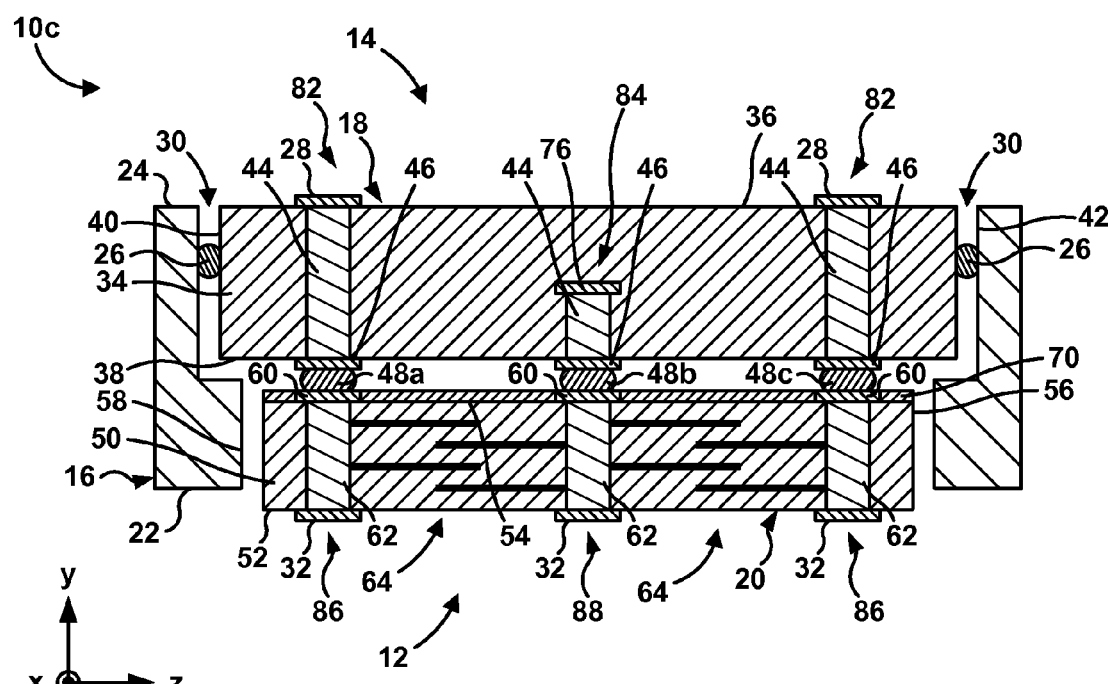
FIGS. 6A and 6B are cross-sectional views taken along section lines A-A and C-C of FIG. 3 that illustrate another example configuration of a feedthrough assembly.
Figure 6B:
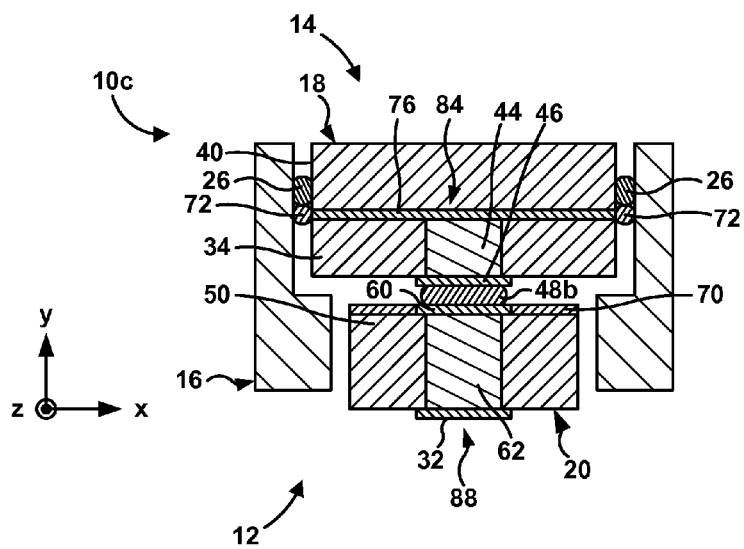

In some examples, feedthrough conductor 44 in feedthrough ground conductive pathway 84 may extend from internally-facing feedthrough side 38 to externally-facing feedthrough side 36. In other examples, as shown in FIGS. 6A and 6B, feedthrough conductor 44 in feedthrough ground conductive pathway 84 may extend only partially through feedthrough substrate 34 (e.g., from internally-facing feedthrough side 38 part way into feedthrough substrate 34).

Feedthrough ground conductive via 76 may be electrically coupled or connected to feedthrough conductor 44. In some examples, feedthrough ground conductive via 76 may extend between feedthrough conductor 44 and feedthrough perimeter wall 40. As shown in FIG. 4C, feedthough ground conductive via may be disposed in a plane within feedthrough 18 (e.g., within feedthrough substrate 34).

In some examples, feedthrough ground conductive via 76 may be formed of silver, silver-palladium, silver-platinum, or another electrically conductive metal or alloy. As shown in FIG. 4C, feedthrough ground conductive via 76 may be electrically coupled or connected to a perimeter conductive contact 74 formed on feedthrough perimeter wall 40. Perimeter conductive contact 74 may be formed of an electrically conductive metal or alloy, such as, for example, silver, silver-palladium, or silver-platinum.

In some examples, perimeter conductive contact 74 may extend along only a portion of feedthrough perimeter wall 40 (as shown in FIGS. 4A-4C). For example, perimeter conductive contact 74 may extend along feedthrough perimeter wall 40 for a length sufficient to make electrical connection with feedthrough ground conductive via 76 and to facilitate electrical connection with ferrule 16. In other examples, perimeter conductive contact 74 may extend substantially along the entire length of feedthrough perimeter wall 40. In some examples, feedthrough 18 may include more than one (e.g., at least two) perimeter conductive contact 74.

Perimeter conductive contact 74 may be electrically coupled to ferrule 16 via an electrical connection 72. In some examples, electrical connection 72 may include a thick film conductive paste, such as an Ag—Pd paste (with or without glass frit). In other examples, electrical connection 72 may include a solder connection, using, for example, indium-silver (In—Ag) alloys, tin-silver (Sn—Ag), tin-copper (Sn—Cu), tin-silver-copper (Sn—Ag—Cu), tin-lead (Sn—Pb), or gold-tin (Au—Sn). In other examples, electrical connection 72 may include a braze joint.

Figure 9:
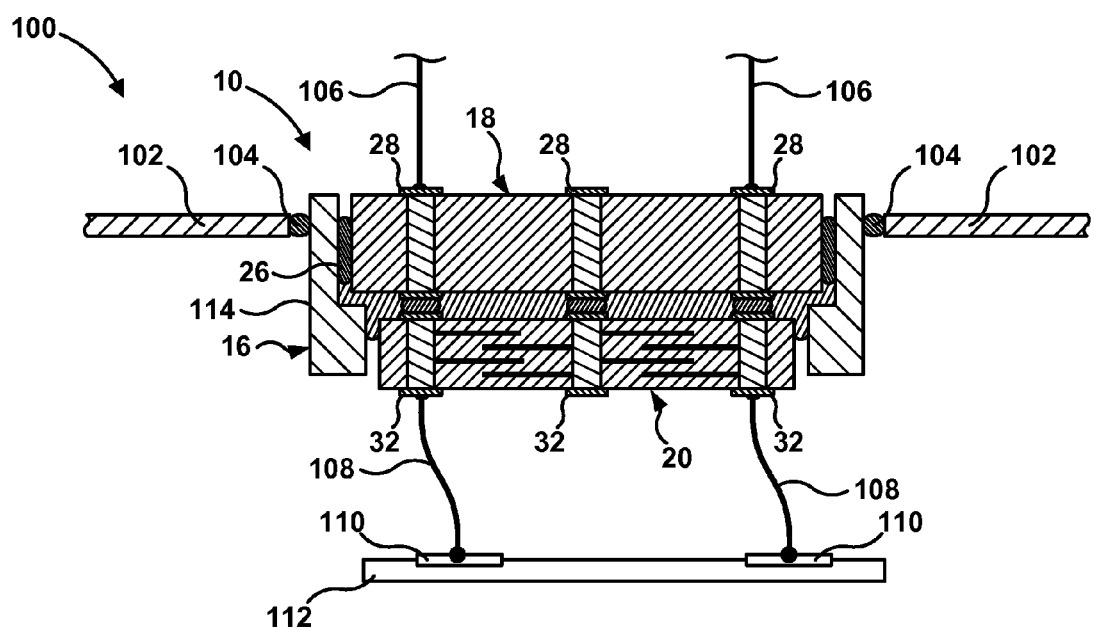
FIG. 9 is a conceptual diagram that illustrates an example feedthrough assembly attached to a housing of an IMD.

Ferrule 16 may be electrically coupled or connected to an electrical ground, such as a housing of an IMD (see FIG. 9). Hence, capacitive filters 64 may be electrically coupled to an electrical ground via filter array ground conductive pathway 88, feedthrough ground conductive pathway 84 (including feedthrough ground conductive via 76 and perimeter conductive contact 74), and ferrule 16. In this way, EMI signals being filtered by capacitive filters 64 are grounded.

FIG. 4C illustrates an example feedthrough assembly 10*a* in which feedthrough ground conductive via 76 is disposed in a plane within feedthrough substrate 34. In other examples, feedthrough ground conductive via 76 may be located at alternative locations of feedthrough 18. For example, feedthrough ground conductive via 76 may not be disposed in a single plane within feedthrough substrate 34, but may be disposed in more than one plane within feedthrough substrate 34. In some examples, feedthrough ground conductive via 76 may extend along at least two of the orthogonal x-y-z axes shown in FIG. 4C.

Figure 5A:
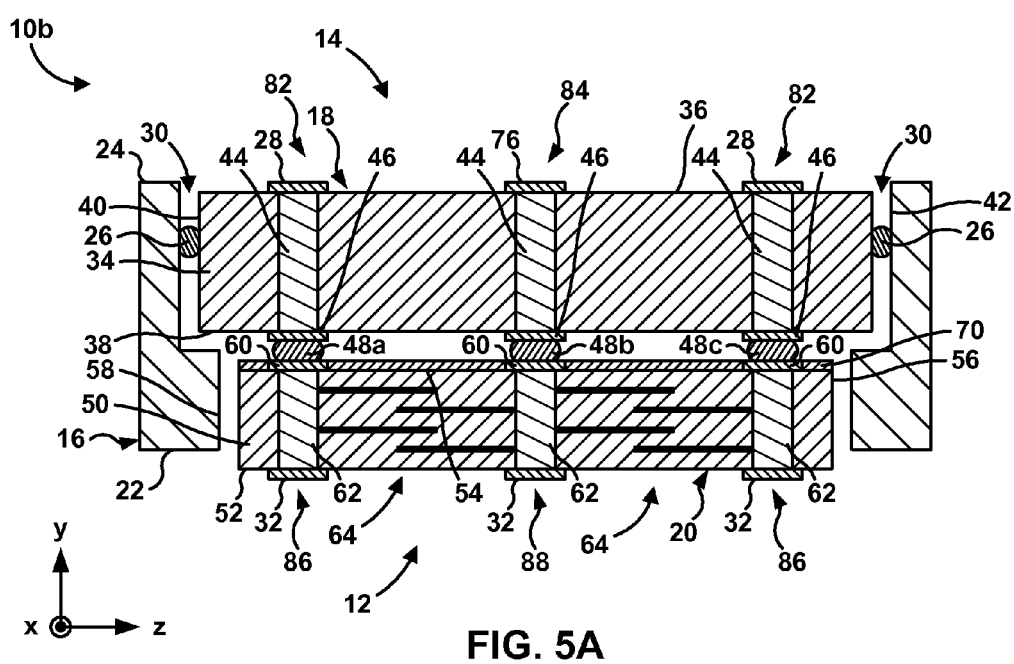
FIGS. 5A and 5B are cross-sectional views taken along section lines A-A and C-C of FIG. 3 that illustrate another example configuration of a feedthrough assembly.
Figure 5B:
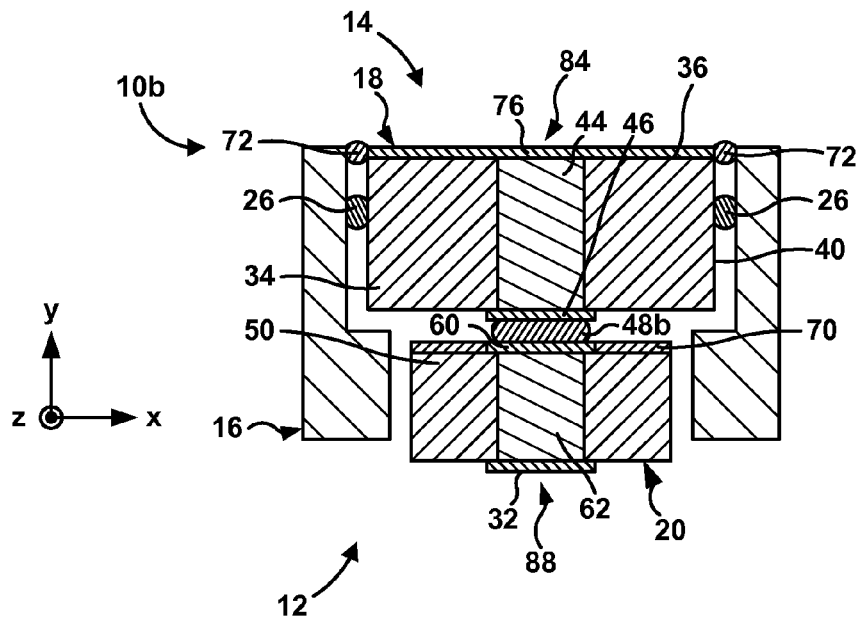

FIGS. 5A and 5B illustrate another example of a feedthrough assembly 10*b*. FIG. 5A is a cross-sectional view taken along section line A-A of FIG. 3. FIG. 5B is a cross-sectional view taken along section line C-C of FIG. 3. In some implementations, feedthrough assembly 10*b* may be similar to or substantially the same as feedthrough assembly 10*a* shown in FIGS. 4A-4C, aside from the differences described herein.

As shown in FIG. 5B, feedthrough assembly 10*b* includes a feedthrough ground conductive via 76 that is disposed on externally-facing side 36 of feedthrough 18. Feedthrough conductor 44 in feedthrough ground conductive pathway 84 extends from internally-facing feedthrough side 38 to externally-facing feedthrough side 36. As shown in FIG. 5B, feedthrough ground conductive via 76 may extend along the direction of the x-axis. In some examples, feedthrough ground conductive via 76 may extend in both (x-axis) directions from feedthrough conductor 44 (e.g., to feedthrough perimeter wall 40 in both the positive x-axis direction and the negative x-axis direction shown in FIG. 5B). In other examples, feedthrough ground conductive via 76 may extend in only one (x-axis) direction from feedthrough conductor 44 (e.g., to feedthrough perimeter wall 40 in one of the positive x-axis direction or the negative x-axis direction shown in FIG. 5B).

Feedthrough ground conductive via 76 may be electrically connected to ferrule 16 by electrical connection 72. As described above, electrical connection 72 may include, for example, a thick film conductive paste, a solder connection, or a braze joint. Although not shown in FIG. 5B, in some examples, feedthrough ground conductive via 76 may be electrically connected to a perimeter conductive contact 74, similar to the example shown in FIG. 4C, and perimeter conductive contact 74 may be electrically connected to ferrule 16 by electrical connection 72.

FIGS. 6A and 6B are conceptual cross-sectional diagrams that illustrate another example feedthrough assembly 10*c*. FIG. 6A is a cross-sectional view taken along section line A-A of FIG. 3. FIG. 6B is a cross-sectional view taken along section line C-C of FIG. 3. In some implementations, feedthrough assembly 10*c* may be similar to or substantially the same as feedthrough assembly 10*a* shown in FIGS. 4A-4C, aside from the differences described herein.

Feedthrough assembly 10*c* includes a feedthrough ground conductive pathway 84 that includes internally-facing feedthrough conductive pad 46, feedthrough conductor 44, and feedthrough ground conductive via 76. Different from feedthrough assembly 10*a* shown in FIGS. 4A-4C, feedthrough conductor 44 does not extend from internally-facing feedthrough side 38 to externally-facing feedthrough side 36. Instead, feedthrough conductor 44 in feedthrough ground conductive pathway 84 extends from internally-facing feedthrough side 38 to feedthrough ground conductive via 76, which is disposed substantially in a plane within feedthrough substrate 34. Because of this, in some examples, feedthrough ground conductive pathway 84 may not include externally-facing feedthrough conductive pad 28.

Similar to feedthrough assembly 10*b* shown in FIGS. 5A and 5B, feedthrough ground conductive via extends in both the positive and negative x-axis directions to feedthrough perimeter wall 40. In other examples, feedthrough ground conductive via 76 may extend in only one (x-axis) direction from feedthrough conductor 44 (e.g., to feedthrough perimeter wall 40 in one of the positive x-axis direction or the negative x-axis direction shown in FIG. 6B).

Feedthrough ground conductive via 76 may be electrically connected to ferrule 16 by electrical connection 72. As described above, electrical connection 72 may include, for example, a thick film conductive paste, a solder connection, or a braze joint. Although not shown in FIG. 6B, in some examples, feedthrough ground conductive via 76 may be electrically connected to a perimeter conductive contact 74, similar to the example shown in FIG. 4C, and perimeter conductive contact 74 may be electrically connected to ferrule 16 by electrical connection 72.

FIGS. 7A and 7B are conceptual cross-sectional diagrams that illustrate another example feedthrough assembly 10d. FIG. 7A is a cross-sectional view taken along section line A-A of FIG. 3. FIG. 7B is a cross-sectional view taken along section line C-C of FIG. 3. In some implementations, feedthrough assembly 10c may be similar to or substantially the same as feedthrough assembly 10a shown in FIGS. 4A-4C, aside from the differences described herein.

As shown in FIGS. 7A and 7B, feedthrough ground conductive pathway 84 includes feedthrough conductive via 76, and may not include feedthrough conductor 44 or externally-facing feedthrough conductive pad 28. Feedthrough ground conductive via 76 may be disposed on internally-facing feedthrough side 38 and electrically connected to thick film conductive paste 48b. Thick film conductive paste 48b may be electrically connected to externally-facing filter array conductive pad 60, which is electrically connected to filter array conductor 62 of filter array ground conductive pathway 88. In this way, filter array ground conductive pathway 88 is electrically coupled to feedthrough ground conductive via 76.

Similar to the examples shown in FIGS. 4A-4C, 5A, 5B, 6A, and 6B, in some implementations, feedthrough ground conductive via 76 may extend in both the positive and negative x-axis directions to feedthrough perimeter wall 40. In other examples, feedthrough ground conductive via 76 may extend in only one (x-axis) direction to feedthrough perimeter wall 40 (e.g., in one of the positive x-axis direction or the negative x-axis direction shown in FIG. 6B).

Feedthrough ground conductive via 76 may be electrically connected to ferrule 16 by electrical connection 72. As described above, electrical connection 72 may include, for example, a thick film conductive paste, a solder connection, or a braze joint. Although not shown in FIG. 7B, in some examples, feedthrough ground conductive via 76 may be electrically connected to a perimeter conductive contact 74, similar to the example shown in FIG. 4C, and perimeter conductive contact 74 may be electrically connected to ferrule 16 by electrical connection 72.

Also shown in FIGS. 7A and 7B is an electrically insulative material 90 that is disposed between feedthrough 18 and capacitive filter array 20. As shown in FIGS. 7A and 7B, electrically insulative material 90 may extend substantially continuously between externally-facing filter array side 54 and internally-facing feedthrough side 38. Electrically insulating material 90 thus may electrically insulate electrically conductive materials and/or pathways disposed between externally-facing filter array side 54 and internally-facing feedthrough side 38 from one another. In some examples, electrically insulating material 90 also may be disposed in the space between feedthrough 18 and ferrule 16 and/or between ferrule and capacitive filter array 20.

In some examples, electrically insulating material 90 may contribute to mechanical connection between ferrule 16 and feedthrough 18, between feedthrough 18 and capacitive filter array 20, and/or between ferrule 16 and capacitive filter array 20.

Electrically insulating material 90 may include any suitable electrically insulating material. For example, electrically insulating material 90 may include an electrically non-conducting (i.e., electrically insulating) polyimide, epoxy, glass, or other electrically insulating polymer. Electrically insulating material 90 may be a material that can be introduced into the gap between internally-facing feedthrough side 38 and externally-facing feedthrough side 54 in a flowable state (e.g., a liquid or polymer melt), and then be converted into a substantially solid state (e.g., by cooling the material or removing a liquid/solvent from the material).

In some examples, electrically insulating material 90 may be introduced into the gap between internally-facing feedthrough side 38 and externally-facing feedthrough side 54 after capacitive filter array 20 has been attached to feedthrough 18 using thick film conductive paste 48. As shown in FIG. 7B, ferrule 16 may define an underfill access channel 92. Underfill access channel 92 may be sized and positioned to allow introduction of electrically insulating material 90 into the gap between internally-facing feedthrough side 38 and externally-facing feedthrough side 54. For example, underfill access channel 92 may extend between an exterior wall of ferrule 16 and second interior wall 58 of ferrule 16 (FIG. 4A). In other examples, underfill access channel 92 may extend between exterior wall of ferrule 16 and first interior wall 34.

In some examples, as shown in FIG. 7B, underfill access channel 92 may be located at a position of ferrule 16 that will be on an interior of a housing of an IMD in which feedthrough assembly 10d is used. This may promote a hermetic seal between the housing of the IMD and feedthrough assembly 10d, and prevent movement of fluids (e.g., bodily fluids) between an interior and an exterior of the IMD. Further details regarding attachment of an example feedthrough assembly to an IMD housing are shown in FIG. 9 and described below.

In other examples, feedthrough 18 may define an underfill access channel 92 between externally-facing feedthrough side 36 and internally-facing feedthrough side 38 and/or capacitive filter array 20 may define an underfill access channel 92 between internally-facing filter array side 52 and externally-facing filter array side 54.

Although shown only in FIGS. 7A and 7B, electrically insulating material 90 and/or underfill access channel 92 may be used in combination with other examples described herein, such as feedthrough assembly 10a, 10b, 10c, and/or 10e).

FIGS. 8A-8C are conceptual cross-sectional diagrams that illustrate another example feedthrough assembly 10e. FIG. 8A is a cross-sectional view taken along section line A-A of FIG. 3. FIG. 8B is a cross-sectional view taken along section line D-D of FIG. 3. FIG. 8C is a cross-sectional view taken along section line C-C of FIG. 3. In some implementations, feedthrough assembly 10c may be similar to or substantially the same as feedthrough assembly 10a shown in FIGS. 4A-4C, aside from the differences described herein.

Feedthrough assembly 10e includes feedthrough ground conductive pathway 84. Although shown in FIGS. 8A-8C as similar to feedthrough ground conductive pathway 84 illustrated in FIGS. 4A-4C, in other examples, feedthrough ground conductive pathway 84 in FIGS. 8A-8C may be similar to those shown in FIGS. 5A and 5B, FIGS. 6A and 6B, or FIGS. 7A and 7B.

Feedthrough ground conductive pathway 84 is electrically coupled to filter array ground conductive pathway 88 by electrically conductive lead 94. Similarly, respective ones of feedthrough active conductive pathways 82 are electrically coupled to respective ones of filter array active conductive pathways 86 by respective electrically conductive leads 94. Together, electrically conductive leads 94 form a lead frame assembly.

As shown in FIGS. 8A-8C, electrically conductive leads 94 mechanically and electrically connect feedthrough 18 and capacitive filter array 20 (e.g., electrically and mechanically connect respective feedthrough conductors 44 to respective filter array conductors 62). The lead frame assembly also may include additional electrically conductive leads 114, which electrically connect filter array perimeter conductive contact 96 with ferrule 16.

Each of electrically conductive leads 94 may be formed of an electrical conductive metal, such as niobium; titanium; titanium alloys such as titanium-6Al-4V or titanium-vanadium; platinum; molybdenum; zirconium; tantalum; vanadium; tungsten; iridium; rhodium; rhenium; osmium; ruthenium; palladium; silver; and alloys, mixtures, and combinations thereof. In some examples, at least some of electrically conductive leads 94 possess sufficient mechanical strength to allow the electrically conductive leads 94 to maintain a gap between electrically insulating layer 70 formed on externally-facing filter array side 54 and feedthrough electrically insulating layer 98 formed on internally-facing feedthrough side 38. In some examples, electrically conductive leads 94 may include bare metal (e.g., with no electrical insulation formed on a surface of electrically conductive leads 94). In other examples, at least one of electrically conductive leads 94 may include electrical insulation formed on a surface of the at least one of electrically conductive leads 94, such as an electrically insulating polymer.

FIGS. 8A-8C illustrates three filter array conductors 62 and three corresponding electrically conductive leads 94. However, in other examples, as described above, capacitive filter array may include fewer than three filter array conductors 62 or more than three filter array conductors 62. In some such examples, feedthrough assembly 10e may include a corresponding number of electrically conductive leads 114 (e.g., one electrically conductive lead 114 for each one of filter array conductors 62).

In some examples, capacitive filter array 20 may include a filter array perimeter conductive contact 96, which may extend at least partially (or substantially fully) around filter array perimeter 56, or capacitive filter array 20 may include a plurality of discrete filter array perimeter conductive contacts 96 (e.g., one filter array perimeter conductive contact 96 for each one of filter array conductors 62). In either example, although FIG. 8A illustrates two electrically conductive leads 94 connecting filter array perimeter conductive contact 96 to ferrule 16, in other implementations, feedthrough assembly 10e may include more than two electrically conductive leads 94 connecting filter array perimeter conductive contact 96 to ferrule 16 or only one electrically conductive lead 114 connecting filter array perimeter conductive contact 96 to ferrule 16. Filter array perimeter conductive contact 96 may be formed of an electrically conductive metal or alloy, such as, for example, silver, silver-palladium, or silver-platinum.

Filter array perimeter conductive contact 96 may be electrically connected to ground electrodes 98. Together with active electrodes 66 electrically connected to filter array conductors 62, ground electrodes 98 may form capacitive filters 64, as best seen in FIG. 8B. Additionally, filter array perimeter conductive contact 96 may be electrically connected to ferrule 16 using electrically conductive leads 94. In other examples, filter array perimeter conductive contact 96 may be electrically connected to ferrule 16 using a thick film conductive paste 48, soldering, welding, a brazing, or the like.

Filter array perimeter conductive contact 96 may facilitate grounding of some capacitive filters 64 to ferrule 16 (and, in some examples, to the housing of the IMD) through the capacitive filter array 20, instead of or in addition to grounding some capacitive filters 64 through feedthrough 18. In the example shown in FIGS. 8A-8C, each of feedthrough active conductive pathways 82 and filter array active conductive pathways 86 is electrically coupled to two capacitive filters 64, one capacitive filter 64 that is electrically connected to ferrule 16 through filter array perimeter conductive contact 96 and one capacitive filter 64 that is electrically connected to ferrule 16 through feedthrough ground conductive via 76. In other examples, some of feedthrough active conductive pathways 82 and filter array active conductive pathways 86 may be electrically connected to ferrule 16 through filter array perimeter conductive contact 96 and others of feedthrough active conductive pathways 82 and filter array active conductive pathways 86 may be electrically connected to ferrule 16 through feedthrough ground conductive via 76.

FIGS. 8A-8C also illustrate a feedthrough electrically insulating layer 98 attached to internally-facing feedthrough side 38. Feedthrough electrically insulating layer 98 may include an electrically insulating material, such as an electrically insulating polymer formed on externally-facing filter array side 54. In one example, feedthrough electrically insulating layer 98 comprises a polyimide polymer with a glass transition temperature of greater than about 400° C. In some examples, feedthrough electrically insulating layer 98 may comprise a low temperature cofired ceramic material or a HTCC material.

Any of the feedthrough assemblies 10 illustrated and described above may be utilized as a feedthrough assembly for an IMD. FIG. 9 is a conceptual diagram that illustrates an example feedthrough assembly attached to a housing of an IMD and electrically coupled to a plurality of leads and a plurality of electrical connections to circuitry.

IMD 100 includes a housing 102 and defines an opening in which feedthrough assembly 10 is disposed. Feedthrough assembly 10 is mechanically attached to housing 102 of IMD 160 by a hermetic seal 104. For example, hermetic seal 104 may be formed between an exterior wall 114 of ferrule 16 and housing 102. Hermetic seal 104 may prevent bodily fluids of the patient from passing into the interior of IMD housing between ferrule 16 and housing 102, which could lead to damage to the internal electronics of the IMD 100. In one example, hermetic seal 104 comprises a braze joint between ferrule 16 and housing 102 (e.g., formed using laser brazing). In other examples, hermetic seal 104 may be formed using diffusion bonding. Examples of materials that may be used to form a hermetic seal 104 include any biocompatible, biostable material capable for forming a hermetic seal 104, such as, gold, a nickel-gold alloy, platinum, and platinum-iridium. Laser sintering of glass may also be used to bond ferrule 16 and housing 102.

In other examples, hermetic seal 104 may include a weld formed between housing 102 and ferrule 16. The weld may be formed of a material that is compatible with the material of housing 102 and the material of ferrule 16. As described above, in some examples, ferrule 16 may include titanium or a titanium alloy, and housing 102 also may include a titanium or titanium alloy. In some examples, the weld is formed using a laser welding process, e.g., to form a Ti—Ti weld.

In some examples, hermetic seal 104 may provide an electrical connection between housing 102 and ferrule 16 and may form a portion of the electrically conductive path between ground electrodes 68 of capacitive filter arrays 64 (see, e.g., FIG. 4A) and housing 102. In some of these examples, housing 102 may act as an electrical ground for the signals filtered by capacitive filter arrays 64.

In some examples, IMD 100 may be device that is configured to deliver a therapy and/or monitor a physiologic condition of a patient. For example, IMD 100 may be a cardiac pacemaker, an implantable cardioverter/defibrillator, or an implantable neurostimulator, and may deliver therapy to or monitor physiologic signals from a patient's heart, muscle, nerve, brain, stomach, or another organ.

IMD 100 encloses circuitry, such as therapy delivery circuitry or sensing circuitry. Therapy delivery circuitry and/or sensing circuitry are represented in FIG. 9 as a printed board (PB) 112. Although not shown in FIG. 9, PB 112 may include electrical components, such as resistors, capacitor, inductors, batteries, integrated circuits, hybrid circuits, analog circuits, or the like mounted to or incorporated into PB 112. PB 112 also includes a plurality of contact pads 110, to which wires 108 are electrically connected.

Wires 108 electrically connect circuitry in or on PB 112 to internally-facing filter array conductive pads 32. Respective wires 108 may be electrically connected to respective contact pads 110 and respective internally-facing filter array conductive pads 32. Electrical connection between wires 108 and contact pads 110 and respective internally-facing filter array conductive pads 32 may be made by, for example, welding or soldering.

IMD 100 is also electrically connected to a plurality of lead conductors 106 via feedthrough assembly 10. For example, respective ones of lead conductors 106 may be electrically connected to respective ones of externally-facing feedthrough conductive pads 28. Lead conductors 106 may be carried by at least one lead body, which may also carry electrodes, to which lead conductors 106 are electrically connected. Lead conductors 106 provide an electrical path through which IMD 100 may deliver electrical stimulation of a target tissue and/or sense physiologic signals from a target tissue.

Figure 10:
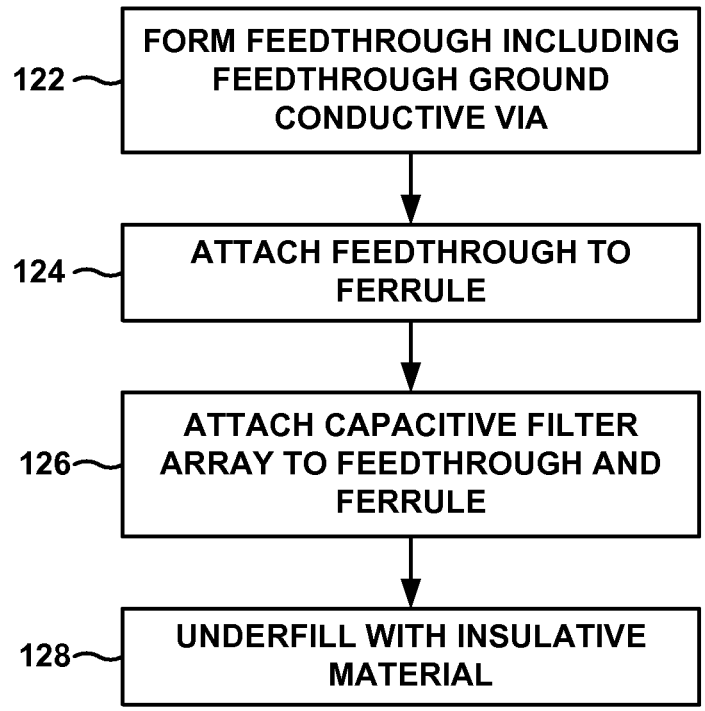
FIG. 10 is a flow diagram that illustrates an example technique for forming a feedthrough assembly.

FIG. 10 is a flow diagram that illustrates an example technique for forming a feedthrough assembly in accordance with this disclosure. The technique of FIG. 10 will be described primarily with respect to feedthrough 10a shown in FIGS. 4A-4C for clarity. However, the technique may be adapted to form any of feedthroughs 10b, 10c, 10d, or 10e, or other feedthroughs in accordance with this disclosure.

The technique illustrated in FIG. 10 may optionally include forming a feedthrough 18 that includes a feedthrough conductive via 76 (122). In some examples, feedthrough substrate 34 includes multi-layer ceramic formed from a plurality of generally planar ceramic layers (not shown in FIGS. 4A and 4B). In some examples, the ceramic may include a high-temperature cofired ceramic (HTCC) material, e.g., a ceramic that is sintered at a temperature of at least about 1300° C., for example a material that is sintered at a temperature of at least about 1600° C. In some implementations, HTCC uses an electrical insulator that includes alumina and may include oxides of Si (silica), Ca (calcia), Mg (magnesia), Zr (zirconia), or the like. In some examples, feedthrough substrate 20 may comprise at least about 70% alumina, for example at least about 90% alumina having a sintering temperature of between about 1550° C. and about 1600° C.

Feedthrough 18 also includes feedthrough conductors 44 and feedthrough ground conductive via 76. Feedthrough conductors 44 and feedthrough ground conductive via 76 may be formed of a metal or alloy. For example, feedthrough conductors 44 and feedthrough ground conductive via 76 may be formed of copper (Cu), silver (Ag), gold (Au), platinum (Pt), palladium (Pd), niobium (Nb), iridium (Ir), titanium (Ti), tungsten (W), molybdenum (Mb), zirconium (Zr), osmium (Os), tantalum (Ta), vanadium (V), rhodium (Rh), rhenium (Re), and ruthenium (Ru), platinum-gold alloys, platinum-iridium alloys, platinum-palladium alloys, gold-palladium alloys, titanium alloys, such as Ti-6Al-4V, Ti-45Nb, Ti-15Mo or titanium-vanadium, or tungsten-molybdenum alloys.

In some examples, feedthrough conductors 44 and/or feedthrough ground conductive via 76 may be formed of a conductive paste that is used to fill via holes to form feedthrough conductors 44 and/or be deposited on feedthrough substrate 34 to form feedthrough ground conductive via 76. The conductive paste may include, for example, a metallic paste that is applied to the via holes, for example a platinum-containing paste, a tungsten-containing paste, Nb-containing paste, Ta-containing paste, Au-containing paste, or a molymanganese-containing paste. Such materials may be biocompatible and biostable materials. In one example, the metallic paste primarily comprises a metallic powder, such as platinum or palladium powder, and an additive to promote bonding with the material of feedthrough substrate 34. The additive may also provide for thermal expansion compatibility between the conductive paste and the HTCC material of feedthrough substrate 34. In one example, the additive comprises alumina, so that the metallic paste may comprise, for example, a majority of metallic powder, such as platinum powder, and a minority of alumina powder or particles mixed therein.

In examples in which feedthrough substrate 34 is formed from multiple ceramic layers, each ceramic layer may be shaped in a green state to have a layer thickness and a plurality of via holes extending there through between an internally facing layer surface and an externally facing layer surface. The ceramic layers then may be coupled together, such as by laminating the layers together, and may be cofired together so that the layers form a substantially monolithic feedthrough substrate 34. In some examples, the via holes of each ceramic layer may be substantially aligned to form generally cylindrical passages that are filled with an electrically conductive material to form feedthrough conductors 44. In examples in which feedthrough ground conductive via 76 is formed in a plane within feedthrough substrate 34, the material from which feedthrough ground conductive via 76 is formed may be deposited on a ceramic layer prior to cofiring the ceramic layers together. In examples in which feedthrough ground conductive via 76 is formed on externally-facing feedthrough side 36 or internally-facing feedthrough side 38, the material from which feedthrough ground conductive via 76 is formed may be deposited on a ceramic layer before or after firing the ceramic layers together.

The technique of FIG. 10 also includes attaching feedthrough 18 to ferrule 16 (124). Feedthrough 18 may be connected to ferrule 16 using any technique that forms hermetic seal 26 between feedthrough 18 and ferrule 16. For example, ferrule 16 and feedthrough 18 may be connected using brazing, diffusion bonding, laser sintering of glass, or the like. Hermetic seal 26 may be formed using a biocompatible, biostable material. Examples of materials that may be used to form a hermetic seal 26 include gold, a nickel-gold alloy, platinum, platinum-iridium, or a biocompatible glass.

Additionally, attaching feedthrough 18 to ferrule 16 (124) may include electrically attaching feedthrough ground conductive via 76 to ferrule 16. As described above, in some examples, this may include using a weld, braze, solder, or thick film conductive paste to form electrical connection 72 between feedthrough ground conductive via 76 to ferrule 16 (or between perimeter conductive contact 74 and ferrule 16).

The technique of FIG. 10 also includes attaching capacitive filter array 20 to feedthrough 18 and ferrule 16 (126). In some examples, attaching capacitive filter array 20 to feedthrough 18 and ferrule 16 (126) may be accomplished using the technique illustrated in FIG. 11.

Figure 11:
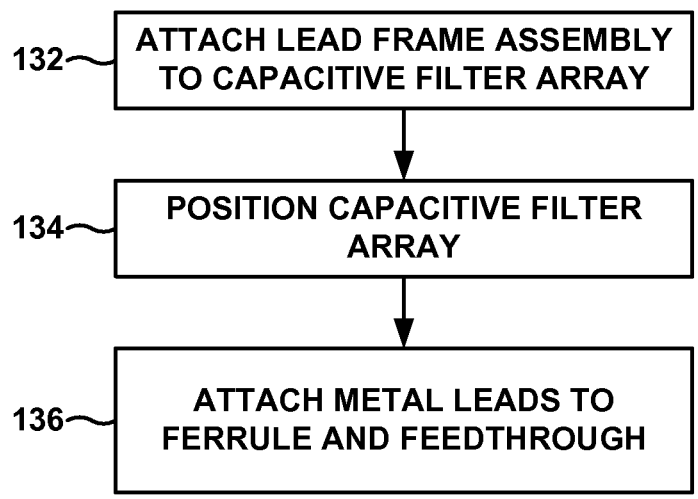
FIG. 11 is a flow diagram that illustrates an example technique for attaching a capacitive filter array to a ferrule and a feedthrough.

The technique illustrated in FIG. 11 may include attaching a lead frame assembly (which includes electrically conductive leads 114) to capacitive filter array 20 (132). In some examples, attaching the lead frame assembly includes attaching a first one of electrically conductive leads 94 directly to a first one of filter array conductors 62, attaching a second one of electrically conductive leads 94 directly to a second one of filter array conductors 62, and attaching a third one of electrically conductive leads 94 directly to a third one of filter array conductors 62. In examples in which capacitive filter array 20 includes a filter array perimeter conductive contact 96, attaching the lead frame assembly to capacitive filter array 20 (132) may include attaching a fourth one of electrically conductive leads 94 to filter array perimeter conductive contact 96. In other examples, capacitive filter array 20 may include a plurality of externally-facing filter conductive pads 60 (see FIGS. 4A-4C), and electrically conductive leads 94 may be attached to respective ones of externally-facing filter conductive pads 60.

Electrically conductive leads 94 may be attached to capacitive filter array 20 using a variety of techniques. For example, electrically conductive leads 94 may be attached to capacitive filter array 20 using laser welding, parallel gap welding, thermosonic bonding, diffusion bonding, ultrasonic welding, opposed gap welding, laser brazing, step gap resistance welding, percussion arc welding, or soldering (conventional or laser).

In other examples, electrically conductive leads 94 may be attached to capacitive filter array 20 using a firing process. In a firing process, capacitive filter array 20 and metals leads 94 may be heated to a temperature between about 700° C. and about 850° C. for between 30 minutes and about 60 minutes, with about 10 minutes of substantially constant temperature at the peak temperature. The heating process may result in a mechanical connection between electrically conductive leads 94 and filter array conductors 62 and (optionally) filter array perimeter conductive contact 96.

Once the lead frame assembly has been attached to capacitive filter array 20 (132), capacitive filter array 20 (including the lead frame assembly) may be positioned in a desired position relative to ferrule 16 and feedthrough 18 (134). The desired position may include a position in which respective ones of electrically conductive leads 94 contact respective ones of feedthrough conductors 44 and (optionally) ferrule 16, as shown in FIGS. 8A and 8B. In some examples, feedthrough 18 may include internally-facing feedthrough conductive pads 46, and capacitive filter array 20 may be positioned so that respective ones electrically conductive leads 94 contact respective ones of internally-facing feedthrough conductive pads 46.

In some examples, described above, electrically conductive leads 94 may possess sufficient mechanical strength to maintain separation between capacitive filter array 20 and feedthrough 18 when capacitive filter array 20 is positioned in the desired position relative to ferrule 16 and feedthrough 18 (134). For example, as shown in FIGS. 8A and 8B, electrically conductive leads 94 may be sufficiently long to result in formation of a gap between electrically insulating layer 70 and feedthrough electrically insulating layer 98. In other examples, electrically conductive leads 94 may be shorter, such that electrically insulating layer 70 and feedthrough electrically insulating layer 98 contact each other when capacitive filter array 20 is positioned in the desired position relative to ferrule 16 and feedthrough 18 (134).

In some examples, the desired position of capacitive filter array 20 relative to ferrule 16 may include positioning at least one of electrically conductive leads 94 contacting ferrule 16 (e.g., when capacitive filter array 20 includes filter array perimeter conductive contact 96). As described above, in some implementations, ferrule 16 may form a portion of an electrically conductive path between capacitive filter array 20 (e.g., at least some of capacitive filters 64) and the housing of the IMD in which feedthrough assembly 10 is used. In some examples, as shown in FIG. 8A, at least one of electrically conductive leads 94 may contact ferrule 16 at internally-facing ferrule side 22. In other examples, at least one of electrically conductive leads 94 may contact ferrule 16 at a different position, such as, for example, second interior wall 58.

In some examples, ferrule 16 may include or consist essentially of an electrically conducting material, and at least one of electrically conductive leads 94 may contact ferrule 16 at substantially any position of ferrule 16 (e.g., any position of ferrule 16 that will be positioned within a housing of an IMD once ferrule 16 is attached to the IMD). In other examples, some portions of ferrule 16 may include an electrically insulating material and other portions of ferrule 16 may include an electrically conducting material. In these examples, at least one of electrically conductive leads 94 may contact ferrule 16 at a portion of ferrule that includes an electrically conducting material.

Once capacitive filter array 20 has been positioned in the desired position relative to ferrule 16 and feedthrough 18, electrically conductive leads 94 may be attached to respective portions of feedthrough 18 and ferrule 16 (136). For example, respective ones of electrically conductive leads 94 may be attached to respective ones of feedthrough conductors 44 (or respective ones of internally-facing feedthrough conductive pads 46, if present) using laser welding, parallel gap welding, thermosonic bonding, diffusion bonding, ultrasonic welding, opposed gap welding, laser brazing, step gap resistance welding, brazed interposer, percussion arc welding, or soldering (conventional or laser). In examples where at least one of electrically conductive leads 94 is attached to ferrule 16, the at least one of electrically conductive leads 94 may be attached to ferrule 16 using a similar process.

Figure 12:
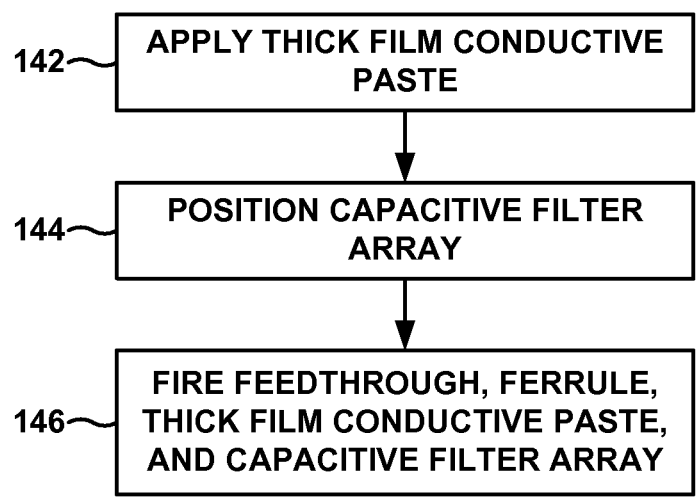
FIG. 12 is a flow diagram that illustrates another example technique for attaching a capacitive filter array to a ferrule and a feedthrough.

In other examples, attaching capacitive filter array 20 to feedthrough 18 and ferrule 16 (126) may be accomplished using the technique illustrated in FIG. 12. The technique illustrated in FIG. 12 may include applying thick film conductive paste 48 to desired locations of feedthrough 18, ferrule 16, and/or capacitive filter array 20 (142). In some examples, the technique may include applying thick film conductive paste 48 to internally-facing feedthrough conductive pads 46. In other examples, the method may include applying thick film conductive paste 48 to externally-facing filter conductive pads 60. In other examples, the technique may include applying thick film conductive paste 48 to internally-facing feedthrough conductive pads 46 and second interior wall 58 (e.g., when capacitive filter substrate 20 includes filter array perimeter conductive contact 96). In other examples, the technique may include applying thick film conductive paste 48 to internally-facing feedthrough conductive pads 46 and filter array perimeter conductive contact 96 (e.g., when capacitive filter substrate 20 includes filter array perimeter conductive contact 96). In other examples, the technique may include applying thick film conductive paste 48 to externally-facing filter conductive pads 60 and second interior wall 58 (e.g., when capacitive filter substrate 20 includes filter array perimeter conductive contact 96). In other examples, the technique may include applying thick film conductive paste 48 to externally-facing filter conductive pads 60 and filter array perimeter conductive contact 96 (e.g., when capacitive filter substrate 20 includes filter array perimeter conductive contact 96).

Thick film conductive paste 48 may be applied to the desired locations of feedthrough 18, ferrule 16, and/or capacitive filter array 20 (142) using any one or combination of a variety of techniques, including, for example, screen printing, brushing, using a dispenser, or the like. Thick film conductive paste 48 may initially be in paste form (e.g., a suspension of a powder mixture of Ag, Pd, and, optionally, glass frit in a liquid carrier). In some examples, the amount of liquid carrier may be selected such that thick film conductive paste 48 is relatively viscous and does not flow readily from the locations at which it is applied (after application). For example, thick film conductive paste may have a viscosity of between about 100 kilocentipoise (kcps; about 1,000 poise) and about 250 (kcps; about 2,500 poise).

Once the thick film conductive paste 48 has been applied to the desired locations of feedthrough 18, ferrule 16, and/or capacitive filter array 20 (142), capacitive filter array 20 may be positioned in a desired orientation relative to ferrule 16 and feedthrough 18 (144). For example, this may include positioning capacitive filter array 20 such that externally-facing filter array side 54 is proximate (near) to internally-facing feedthrough side 38 (e.g., so that, in examples in which thick film conductive paste 48 is used to electrically connect internally-facing feedthrough conductive pads 46 and externally-facing filter array conductive pads 60, thick film conductive paste 48a, 48b, 48c is contacting both internally-facing feedthrough conductive pads 46 and externally-facing filter array conductive pads 60). This may also include positioning capacitive filter array 20 such that filter array perimeter 56 is proximate (near) to second interior wall 58 of ferrule 16 (e.g., so that, in examples in which thick film conductive paste 48 is used to electrically connect filter array perimeter conductive contact 96 and second interior wall 56, thick film conductive paste is contacting both perimeter conductive contact 72 and second interior wall 56).

After capacitive filter array 20 has been positioned in the desired orientation relative to ferrule 16 and feedthrough 18 (144), feedthrough assembly 10a may be heated to convert thick film conductive paste 48 from a paste to a relatively solid (e.g., an Ag—Pd alloy with glass frit) material (146). For example, feedthrough assembly 10 may be heated at a temperature between about 700° C. and about 850° C. for between about 30 minutes and about 60 minutes, with about 10 minutes of substantially constant temperature at the peak temperature. By heating feedthrough assembly 10 and converting thick film conductive paste 48 to a relatively solid material, mechanical and electrical connection may be made between respective ones of internally-facing feedthrough conductive pads 46 and respective ones of externally-facing filter array conductive pads 60, which may result in mechanical connection between feedthrough 18 and capacitive filter array 20. Similarly, heating feedthrough assembly 10 and converting thick film conductive paste 48 to a relatively solid material may make mechanical and electrical connection between filter array perimeter conductive contact 96 and second interior wall 58 (in examples in which capacitive filter array 20 includes filter array perimeter conductive contact 96), which may result in mechanical connection between ferrule 16 and capacitive filter array 20.

Regardless of the technique used to attach capacitive filter array 20 to feedthrough 18 and ferrule 16 (126), attaching capacitive filter array 20 to feedthrough 18 includes electrically coupling a filter array ground conductive pathway 88 to feedthrough ground conductive via 76. In some examples, the electrical coupling may be accomplished using electrically conductive leads 94 and/or feedthrough conductor 44 in feedthrough ground conductive pathway 84. In other examples, the electrical coupling may be accomplished using thick film conductive paste 48b and/or feedthrough conductor 44 in feedthrough ground conductive pathway 84.

As indicated above, capacitive filter array 20 includes ground electrodes 68 of capacitive filters 64. At least some ground electrodes 68 may be electrically connected to a filter array conductor in filter array ground conductive pathway 88. Feedthrough ground conductive via 76 may be electrically coupled (e.g., using electrical connection 72 and/or perimeter conductive contact 74) to ferrule 16, which may be electrically coupled to a housing 102 of an IMD 100 (FIG. 9). Hence, by electrically coupling filter array ground conductive pathway 88 to feedthrough ground conductive via 76, an electrical path between ground electrodes 68 and an electrical ground (housing 102) may be established, which provides an electrical ground for signals filtered by capacitive filters 64.

Returning now to FIG. 10, the technique optionally may include underfilling the gap between capacitive filter array 20 and ferrule 18 with an electrically insulating material 90 (128). As described above, electrically insulating material 90 may include a material that can be present in a flowable form, such as a liquid, suspension or polymer melt. Electrically insulating material 90 may be introduced into the gap between internally-facing feedthrough side 38 and externally-facing filter array side 54 through an underfill access channel, such as underfill access channel 92 defined by ferrule 16 or an underfill access channel defined by feedthrough 18 or capacitive filter array 20. Once the flowable electrically insulating material 90 has been introduced into the gap between internally-facing feedthrough side 38 and externally-facing filter array side 54, electrically insulating material 90 may be converted to a substantially solid material, such as by cooling electrically insulating material 90 or removing a liquid carrier or solvent from electrically insulating material 90.

Various examples have been described. These and other examples are within the scope of the following claims.

The invention claimed is:

1. A method comprising:
    attaching a perimeter wall of a cofired feedthrough to an interior wall of a ferrule to form a hermetic seal between the cofired feedthrough and the ferrule, wherein the cofired feedthrough comprises a feedthrough ground conductive via and a feedthrough ground conductive pathway electrically coupled to the feedthrough ground conductive via;
    electrically coupling the feedthrough ground conductive via to the ferrule;
    attaching a cofired capacitive filter array to the feedthrough, wherein the cofired capacitive filter array includes a filter array ground conductive pathway and at least two filter array active conductive pathways, wherein the at least two filter array active conductive pathways are capacitively coupled to the filter array ground conductive pathway; and
    electrically coupling the filter array ground conductive pathway to the feedthrough ground conductive pathway.

2. The method of claim 1, wherein electrically coupling the cofired feedthrough ground conductive via to the ferrule comprises:
    electrically coupling a perimeter conductive contact formed on a perimeter wall of the feedthrough to the ferrule, wherein the perimeter conductive contact is electrically connected to the feedthrough ground conductive via.

3. The method of claim 2, wherein electrically coupling the perimeter conductive contact formed on the perimeter wall of the cofired feedthrough to the ferrule comprises:
    forming an electrical connection between the feedthrough ground conductive via and the ferrule using at least one of brazing, welding, soldering, or disposing a thick film conductive paste between the perimeter conductive contact and the ferrule.

4. The method of claim 1, wherein electrically coupling the feedthrough ground conductive via to the ferrule comprises:
 forming an electrical connection between the feedthrough ground conductive via and the ferrule using at least one of brazing, welding, soldering, or disposing a thick film conductive paste between the feedthrough ground conductive via and the ferrule.

5. The method of claim 1, wherein electrically coupling the filter array ground conductive pathway to the feedthrough ground conductive via comprises:
 electrically coupling the filter array ground conductive pathway and the feedthrough ground conductive via using an electrically conductive lead.

6. The method of claim 1, wherein electrically coupling the filter array ground conductive pathway to the feedthrough ground conductive via comprises:
 electrically coupling the filter array ground conductive pathway and the feedthrough ground conductive via using a thick film conductive paste.

7. The method of claim 1, further comprising:
 electrically and mechanically coupling the ferrule to a housing of an implantable medical device.

\* \* \* \* \*